(12) United States Patent
Poothokaran et al.

(10) Patent No.: US 11,625,494 B2
(45) Date of Patent: Apr. 11, 2023

(54) DATA PRIVACY POLICY BASED NETWORK RESOURCE ACCESS CONTROLS

(71) Applicant: Avast Software s.r.o., Prague (CZ)

(72) Inventors: John Poothokaran, Palo Alto, CA (US); Armin Wasicek, El Cerrito, CA (US)

(73) Assignee: Avast Software s.r.o., Prague (CZ)

( * ) Notice: Subject to any disclaimer, the term of this patent is extended or adjusted under 35 U.S.C. 154(b) by 546 days.

(21) Appl. No.: 16/784,222

(22) Filed: Feb. 6, 2020

(65) Prior Publication Data

US 2021/0248247 A1 Aug. 12, 2021

(51) Int. Cl.
| | | |
|---|---|---|
| *G06F 16/00* | (2019.01) | |
| *G06F 21/62* | (2013.01) | |
| *G06F 16/242* | (2019.01) | |
| *G06K 9/62* | (2022.01) | |
| *G06N 3/08* | (2023.01) | |
| *G06F 16/958* | (2019.01) | |

(Continued)

(52) U.S. Cl.
CPC .......... *G06F 21/62* (2013.01); *G06F 9/44526* (2013.01); *G06F 16/242* (2019.01); *G06F 16/955* (2019.01); *G06F 16/958* (2019.01); *G06F 16/9535* (2019.01); *G06K 9/6215* (2013.01); *G06K 9/6282* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 9,003,542 B1 * | 4/2015 | MacKay | ................. | G06F 21/50 |
| | | | | 726/26 |
| 2002/0152246 A1 * | 10/2002 | Critchlow | ............... | G06F 40/53 |
| | | | | 715/265 |

(Continued)

FOREIGN PATENT DOCUMENTS

| | | | | |
|---|---|---|---|---|
| CN | 110532451 A | * | 12/2019 | |
| CN | 112068844 A | * | 12/2020 | ............... G06F 8/34 |
| WO | WO-2013098830 A1 | * | 7/2013 | ......... G06F 17/3089 |

OTHER PUBLICATIONS

International Search Report dated Oct. 18, 2019 for PCT/US 2019052445.

(Continued)

*Primary Examiner* — Bai D Vu
(74) *Attorney, Agent, or Firm* — Dovas Law, P.C.

(57) ABSTRACT

A method for enabling website access is provided. The method includes detecting an attempt to access a particular website by a computing device via a network, the particular website including one or more webpages, and accessing a particular data privacy policy for the particular website. Scores of the particular data privacy policy are determined based on text of the particular data privacy policy, and a particular multidimensional coordinate is determined based on the scores of the particular data privacy policy. A map including the particular multidimensional coordinate is displayed via the computing device. An instruction from a user is received via the computing device to enable accessing of the particular website, and the accessing by the computing device of the particular website is enabled in response to the instruction from the user.

40 Claims, 14 Drawing Sheets

(51) Int. Cl.
*G06F 16/955* (2019.01)
*G06F 9/445* (2018.01)
*G06F 16/9535* (2019.01)

(56) References Cited

U.S. PATENT DOCUMENTS

| | | |
|---|---|---|
| 2010/0169910 A1 | 7/2010 | Collins et al. |
| 2013/0150004 A1 | 6/2013 | Rosen |
| 2014/0344861 A1 | 11/2014 | Berner et al. |
| 2017/0041454 A1 | 2/2017 | Nicholls et al. |
| 2017/0277796 A1 | 9/2017 | Kim |
| 2019/0050710 A1 | 2/2019 | Wang et al. |
| 2020/0053121 A1* | 2/2020 | Wilcox ............... G06F 40/205 |
| 2020/0349280 A1* | 11/2020 | Cook .................. G06F 21/6245 |
| 2020/0380171 A1* | 12/2020 | Bonat ................. G06F 21/6245 |
| 2021/0342759 A1* | 11/2021 | Beaumont ........... G06F 15/76 |
| 2022/0188519 A1* | 6/2022 | Briody ................ G06N 3/08 |

OTHER PUBLICATIONS

Siwei Lai, Liheng Xu, Kang Liu, Jun Zhao, 2015. Recurrent Convolutional Neural Networks for Text Classification, Institute of Automation, Chinese Academy of Sciences, China.

Jiwei Li, Minh-Thang Luong and Dan Jurafsky, 2015. A Hierarchical Neural Autoencoder for Paragraphs and Documents, arXiv:1506.01057v2.

ParallelDot World Class AI Solutions at your fingertips, Breakthrough Research Papers and Models for Sentiment Analysis, https://blog.paralleldots.com/data-science/breakthrough-research-papers-and-models-for-sentiment-analysis/, accessed Apr. 23, 2019.

Google Sites, Usable Privacy. https://explore.usableprivacy.org/sites.google.com/?view=machine. Accessed Jan. 21, 2020.

* cited by examiner

DATA PRIVACY POLICY BASED NETWORK RESOURCE ACCESS CONTROLS

FIELD OF INVENTION

The invention relates generally to data privacy, and more particularly to website and computer application data privacy.

BACKGROUND

Data sharing permissions, data collection permissions, and data requirements are set forth in data privacy policies (also known simply as "privacy policies") of websites, webpages within websites, applications, and other network-accessible resources. Websites, applications, and platforms, for example Facebook™, LinkedIn™, and Google™ social media and messaging applications and platforms generally require a user to explicitly accept the terms of their data privacy policies prior to using the websites, applications, or platforms. Applications implementing data privacy policies can include for example standalone applications, plugins (e.g., web browser plugins), add-ons, or extensions to existing applications. The average computer user would need countless hours to read the data privacy policies of all the websites and applications they use. Further, the data privacy policy of the average website or application is on a college reading level. Consequently data privacy policies are not frequently read by computer users.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for enabling website access is provided. The method includes detecting an attempt to access a particular website by a computing device via a network, the particular website including one or more webpages, and accessing a particular data privacy policy for the particular website. Scores of the particular data privacy policy are determined based on text of the particular data privacy policy, and a particular multidimensional coordinate is determined based on the scores of the particular data privacy policy. A map including the particular multidimensional coordinate is displayed via the computing device. An instruction from a user is received via the computing device to enable accessing of the particular website, and the accessing by the computing device of the particular website is enabled in response to the instruction from the user.

A method of enabling application access is also provided. The method includes detecting an attempt to access a particular application via a computing device, and accessing a particular data privacy policy for the particular application via a network. Scores of the particular data privacy policy are determined based on text of the particular data privacy policy and a particular multidimensional coordinate is determined based on the scores of the particular data privacy policy. A map including the particular multidimensional coordinate is displayed via the computing device, and an instruction is received from a user via the computing device to enable accessing of the particular application. The accessing of the particular application via the computing device is enabled in response to the instruction from the user.

A method of disabling website access is also provided. The method includes detecting an attempt to access a particular website by a computing device via a network, the particular website including one or more webpages. The method further includes accessing a particular data privacy policy for the particular website and analyzing text of the particular data privacy policy to identify particular sections of the particular data privacy policy, the identifying of the particular sections of the particular data privacy policy including identifying a plurality of topics of the particular data privacy policy. A particular multidimensional coordinate is determined based on the text of the particular data privacy policy, and a map is displayed via the computing device including the particular multidimensional coordinate. The particular data privacy policy and indications of the particular sections of the particular data privacy policy are displayed via the computing device, and an instruction from a user is received via the computing device to disable the accessing of the particular website. The accessing by the computing device of the particular website is disabled in response to the instruction from the user.

A web browser process is provided. The process includes loading a webpage by a web browser executed on a computing device and searching by a plugin in the web browser for a link to a data privacy policy on the webpage. The process further includes downloading and analyzing the data privacy policy via the plugin and applying one or more classifiers to text of the data privacy policy to generate a multidimensional coordinate and identify topics and sections of the data privacy policy. A mapping of the multidimensional coordinate is displayed via the plugin. An instruction to inspect the data privacy policy is received from a user via the computing device, and the data privacy policy and the indications of the topics and the sections of the data privacy policy are displayed via the computing device in response to the instruction from the user to inspect the data privacy policy. An instruction from the user to not accept the webpage is received via the plugin, and the plugin initiates a closing or a navigating away from the webpage in response to the instruction from the user to not accept the webpage.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
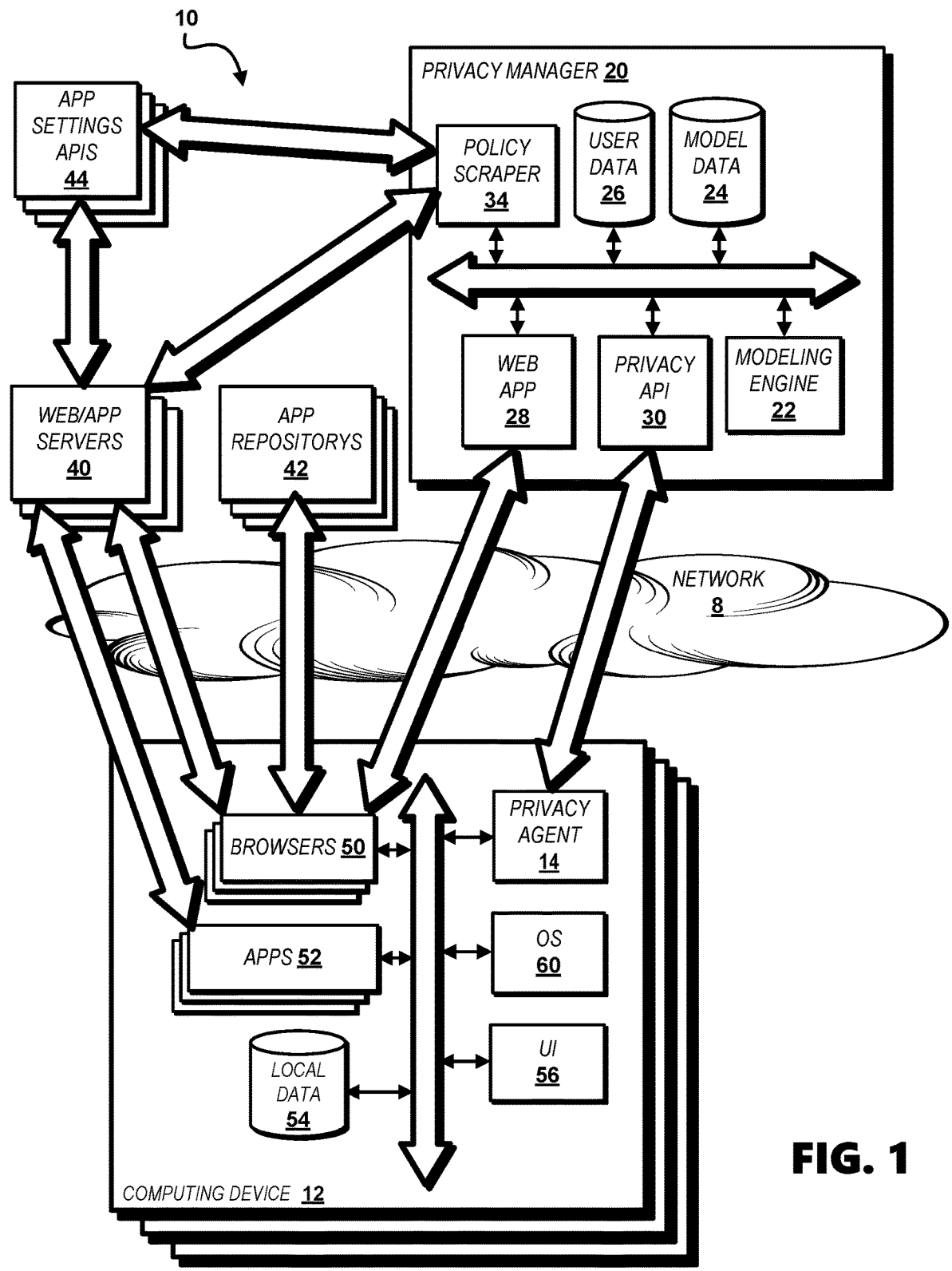
FIG. 1 shows a system for enabling user access to network resources based on data privacy policies of the network resources.

Referring to FIG. 1, a system 10 for enabling user access to network resources based on data privacy policies (also herein referred to as "privacy policies") of the network resources is provided. The system 10 is provided in a communications network 8 including one or more wired or wireless networks or a combination thereof, for example including a local area network (LAN), a wide area network (WAN), the Internet, mobile telephone networks, and wireless data networks such as Wi-Fi™ and 3G/4G/5G cellular networks. Operating systems 60 (hereinafter "OS 60") are executed on computing devices 12. The system 10 enables notifying users of data privacy policies of websites and applications, and receiving instructions to enable or disable access to websites, webpages of websites, and applications. Further, the system 10 enables the providing of a computing environment for a user to manage the user's electronic privacy preferences.

A network-connectable processor-enabled privacy manager 20 enables a plurality of survey queries to be provided to a user of a computing device 12. The queries can be provided in a user interface 56 via instructions from a privacy agent 14 based on data transmitted from a privacy application program interface (API) 30 of the privacy manager 20. Alternatively, queries can be provided in the user interface 56 based on data transmitted from a web application 28 enabled by the privacy manager 20 and accessible via a web browser 50 executed on the computing device 12. A user's responses to the survey queries beneficially reflect the importance to the user of topics including data sharing permissions, data collection permissions, or website or application data requirements, which information is stored in a user datastore 26 or local datastore 54 and used by the privacy manager 20 or the privacy agent 14 in providing notifications regarding website or application data privacy policies.

The privacy manager 20 via the privacy agent 14 enables displaying of visual representations of one or more of data sharing permissions, data collection permissions, and website or application data requirements set forth in data privacy policies of websites, webpages within websites, applications, or other network-accessible resources. Websites and applications can include for example social media or messaging applications or platforms for example Facebook™, LinkedIn™, and Google™ social media or messaging applications or platforms. Applications can include standalone applications, plugins, add-ons, or extensions to existing applications, for example web browser plugins. Applications or components thereof can be installed and executed locally on a computing device 12 or installed and executed on remote computing systems accessible to the computing device 12 via a communications network 8, for example the Internet.

A policy scraper 34 can search for and download a data privacy policy corresponding to a particular application, website, or webpage by accessing a website server or application server 40 (hereinafter "web/app server") or an application settings application program interface (API) 44 which communicates permissions to web/app server 40. Web/app servers 40 can function to enable local applications 52 or components of a local application 52. Web/app servers 40 can further enable network-based applications, webpages, or services accessible via a web browser 50. Local applications 52 can be downloaded for example via a web browser 50 from an application repository 42. The privacy agent 14 monitors user activity on the computing device 12 including a user's use of local and network-based applications, accessing of websites, explicit and implicit acceptance of application and website data privacy policies. Statistics of such use is used by the modeling engine 22 to build data-driven statistical models of user privacy preference stored in the model datastore 24 of the privacy manager 20 or the local datastore 54 of the computing device 12. The modeling engine 22 can for example function under the assumption that a user would consent to terms of a data privacy policy if that user had already consented to similar terms of another data privacy policy in the past.

The modeling engine 22 enables mapping of data privacy policies of different websites and applications to which a user requests access, which mapping can be displayed in a user interface 56 of the computing device 12 via the privacy agent 14 or via the web application 28 through a web browser 50. The mapping can enable users to compare data privacy policies in a visual way using analogies to facilitate understanding. Beneficially a mapped data privacy policy is displayed in relation to the data privacy policy of one or more well-known websites or applications or one or more websites or applications previously accessed or used by the user.

Figure 2A:
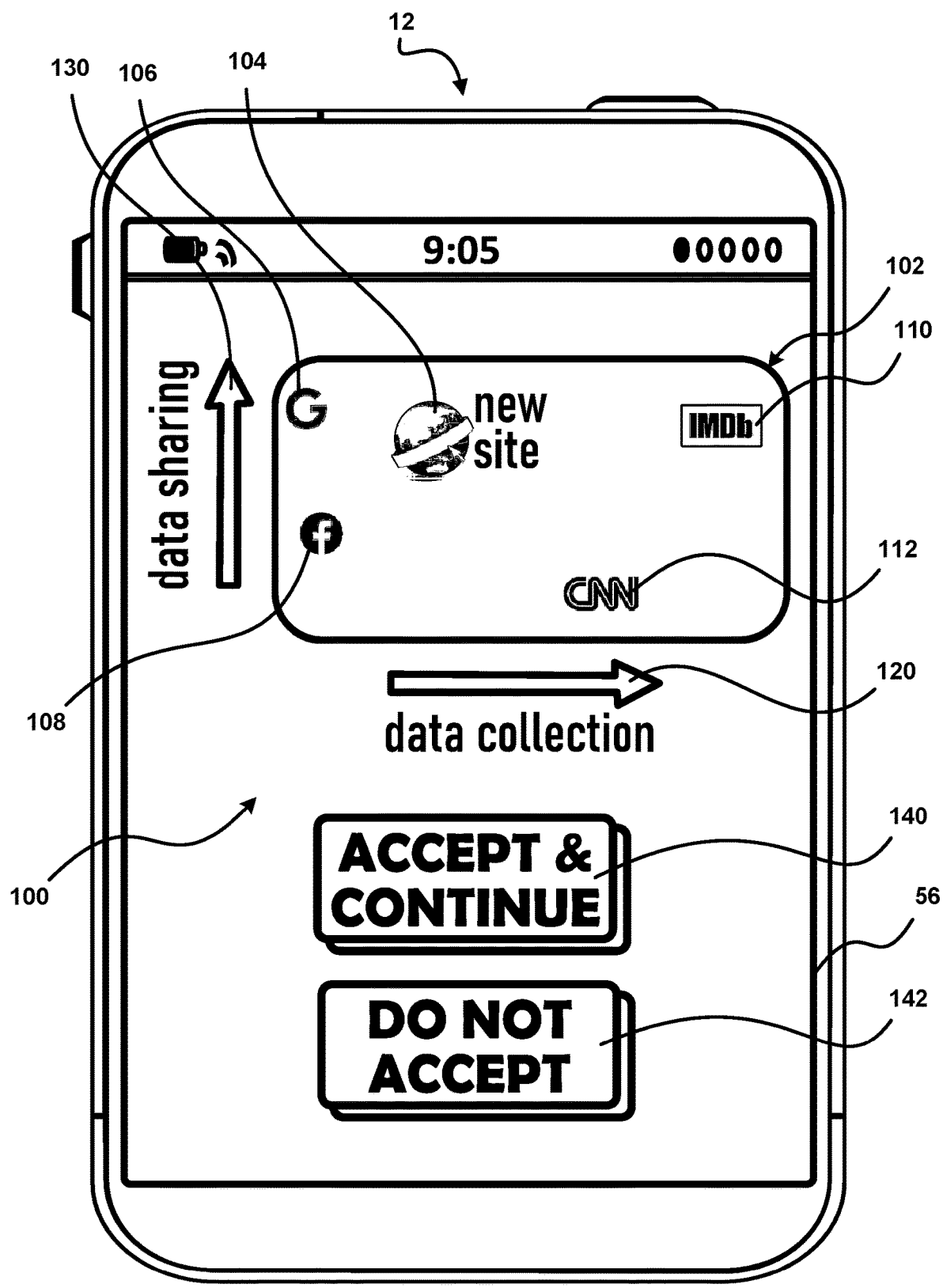
FIGS. 2A-2C show example interactive displays for instituting network resource access controls.

The modeling engine 22 enables graphically mapping privacy levels of a website or application to which a user attempts to access relative to other websites and applications. Use of graphics rather than text and by introducing a relative view rather than an absolute view allows a user to take a short time span to digest data regarding the privacy of a particular application or website. The modeling engine 22 further enables drill-downs along different graphical dimensions corresponding to different topics or categories of data. Referring to FIG. 2A, an exemplary privacy policy map 102 is generated as part of a first exemplary interactive display 100 by the modeling engine 22 via the user interface 56 of the computing device 12 in response to a user attempting to access a website not before accessed by the user. The exemplary privacy policy map 102 is displayed via the privacy agent 14 which plots a platform privacy indication of the website attempted to be accessed (i.e. a new platform privacy indication 104) and platform privacy indications of various content and social media platforms including a Google™ website (i.e. a Google™ indication 106), a Facebook™ website (i.e. a Facebook™ indication 108), an IMDb™ website (i.e. an IMDb™ indication 110), and a CNN™ website (i.e. a CNN™ indication 112).

The mapped platform privacy indications 104, 106, 108, 110, 112 are plotted in two dimensions. A first dimension is defined by a data collection axis 120, wherein moving in the direction of the arrow of the data collection axis 120 corresponds to a greater amount of collected data. A second dimension is defined by a data sharing axis 130, wherein moving in the direction of the arrow of the data sharing axis 130 corresponds to a greater amount of shared data. Alternatively, privacy platform indications can further be plotted along a third axis, for example defined by a data use axis corresponding to permitted use of collected data or a class of data axis corresponding to particular classes of data permitted to be collected. Based on the mapped platform privacy indications 104, 106, 108, 110, 112, the new website's data privacy policy is somewhat more similar to the data privacy policy of the Google™ website and the Facebook™ website than to the data privacy policies of the CNN™ website and the IMDb™ website. After visually comparing the positions of the mapped platform privacy indications 104, 106, 108, 110, 112, a user can choose to allow access to the new website via an "accept & continue" button 140 or to block access to the new website via a "do not accept" button 142. If the "accept & continue" button 140 is actuated by a user, the user is enabled to access the new website on the computing device 12 and on other devices operated by the user and running a privacy agent 14 in communication with the privacy manager 20. If the "do not accept" button 142 is actuated by a user, the new website is blocked on the computing device 12 in current operation by the user and on other computing devices 12 operated by the user and running a privacy agent 14 in communication with the privacy manager 20, and the user is navigated away from the new website. Lists of blocked and lists of enabled websites and applications for each user are maintained in a user datastore 26 of the privacy manager 20, which lists are synchronized with local datastores 54 of each user's computing devices 12.

Figure 2B:
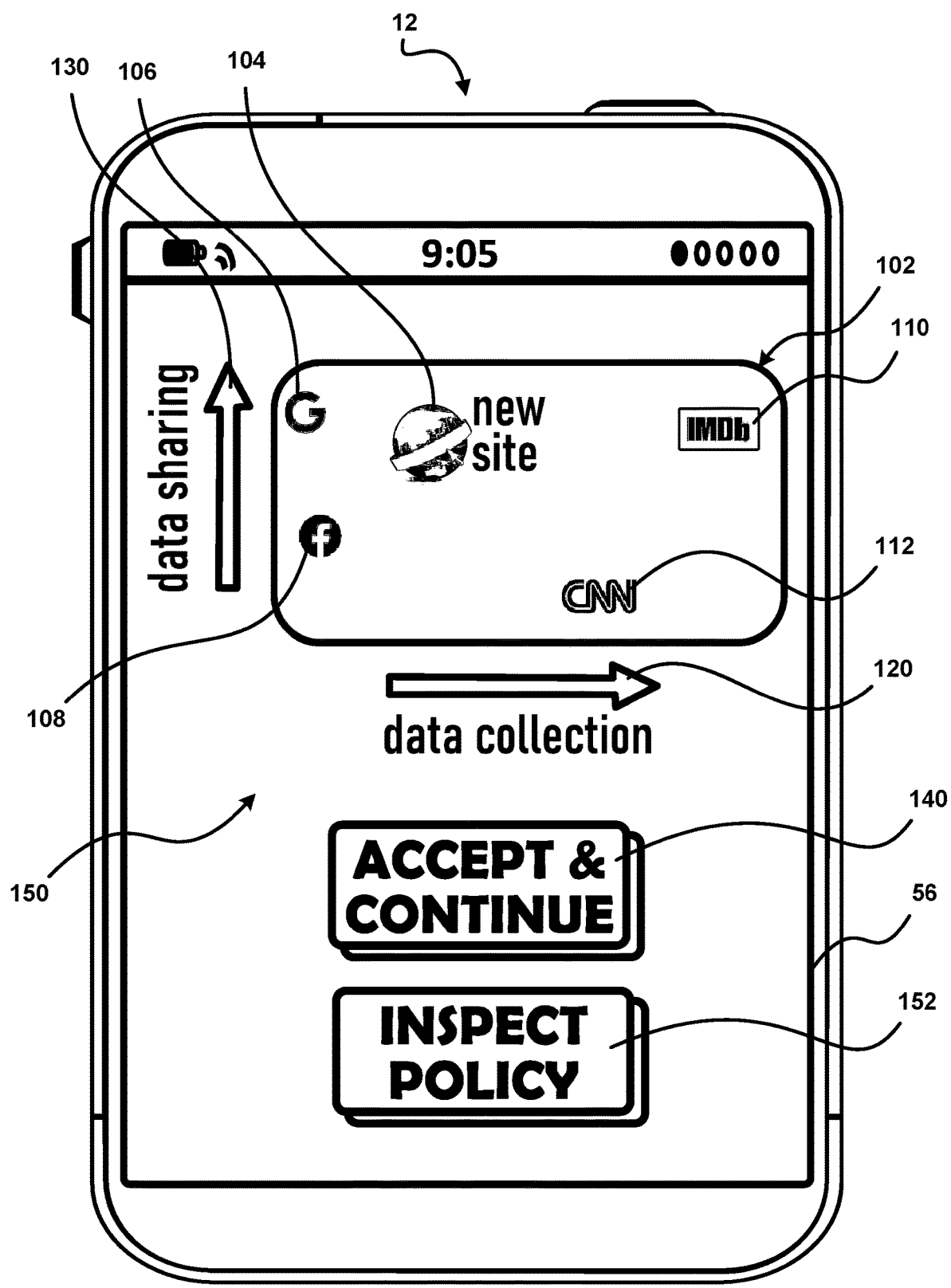

Referring to FIG. 2B, the exemplary privacy policy map 102 is generated as part of a second exemplary interactive display 150 by the modeling engine 22 via the user interface 56 of the computing device 12 in response to a user attempting to access a website not before accessed by the user. The second exemplary interactive display 150 is identical to the first exemplary interactive display 100 except that it includes an "inspect policy button" 152 instead of the "do not accept" button 142. If the "inspect policy button" 152 is actuated by a user, the user is directed to a display showing highlighted and labeled sections of a data privacy policy of the new website, for example the third exemplary interactive display 160 of FIG. 2C.

Figure 2C:
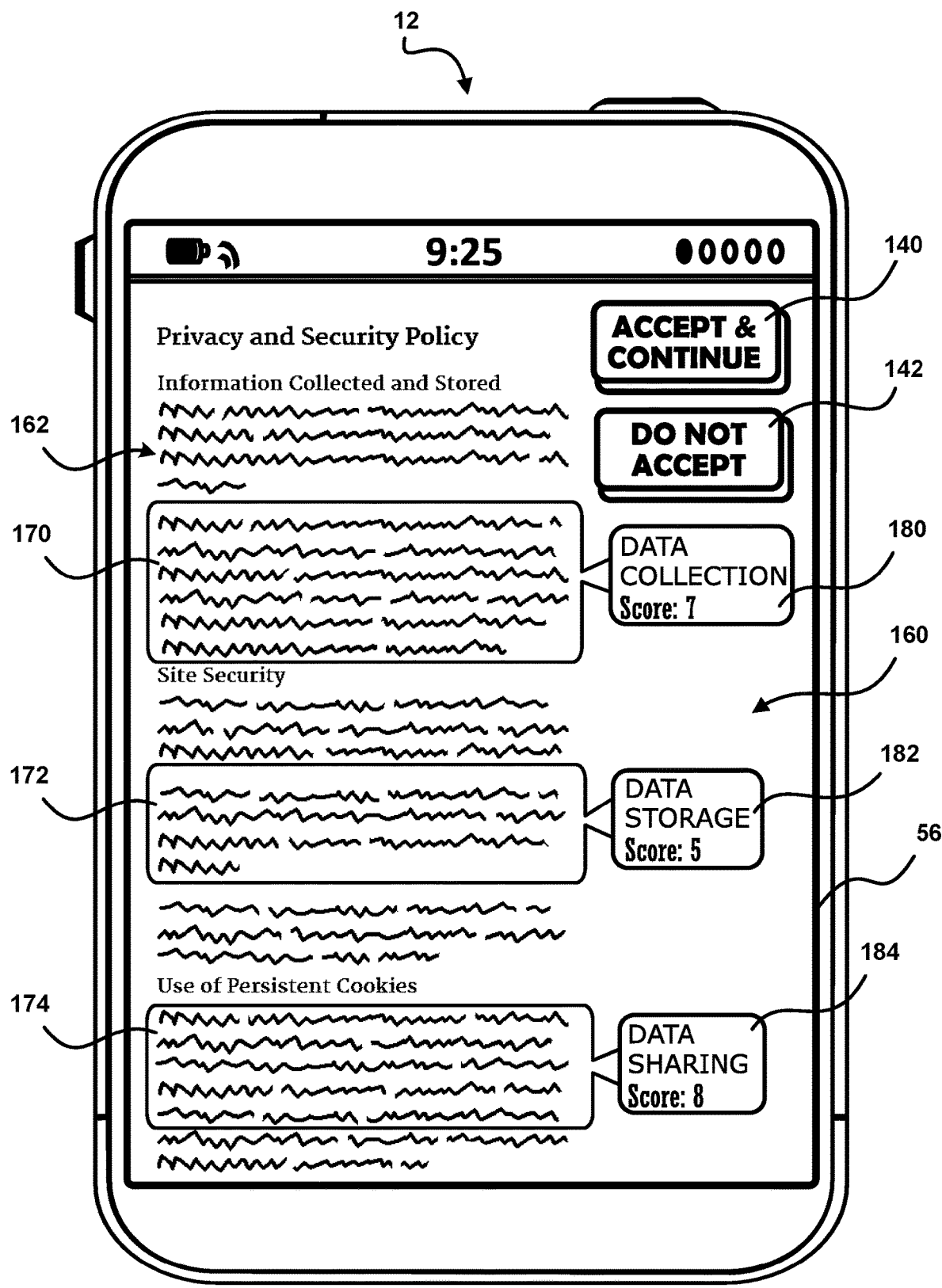

Referring to FIG. 2C, the third exemplary interactive display 160 is generated by the modeling engine 22 via the user interface 56 of the computing device 12 in response to a user request after attempting to access a website not before accessed by the user. The third exemplary interactive display 160 can be generated for example based on a user's actuation of the "inspect policy" button 152 within the second exemplary interactive display 150 of FIG. 2B. The third exemplary interactive display 160 includes the "accept and continue" button 140 for enabling a user to access the new website on the computing device 12 and on other devices operated by the user and running a privacy agent 14 in communication with the privacy manager 20. The third exemplary interactive display 160 further shows a data privacy policy 162 of a website for which access is attempted by a user. Sections of the data privacy policy 162 and text therein are highlighted within highlight boxes 170, 172, 174. The highlighted sections identify topics (e.g., data sharing, data collection, data storage, and data requirements) or classes of data (e.g., names, addresses, location, or other personally identifiable information). Section labels 180, 182, 184 provide a description of an identified topic and a privacy sentiment level score on a scale of 1 through 10, a higher score corresponding to a higher level of data privacy. A first section label 180 corresponding to a first highlighted box 170 identifies a data privacy policy section describing "data collection" and having a privacy sentiment level score of "7". A second section label 182 corresponding to a second highlighted box 172 identifies a data privacy policy section describing "data storage" and having a privacy sentiment level score of "5". A third section label 184 corresponding to a third highlighted box 174 identifies a data privacy policy section identified as describing "data sharing" and having a privacy sentiment level score of "8".

Artificial intelligence algorithms are used by the modeling engine 22 and the privacy agent 14 to analyze data privacy policies of platforms including websites and applications to perform topic modeling, sentiment analysis, classification, and question answering via natural language processing. Privacy levels are determined along different dimensions beneficially corresponding to different topics, different data types, or different data use or sharing protocols. Privacy levels are beneficially determined for different sections of a particular data privacy policy which levels can be aggregated for determining an overall privacy level for a particular dimension (e.g., a particular topic). Similarity between data privacy policies can be determined based on topic modeling and sentiment analysis.

In classifying data privacy policies, categories of data collected and shared are identified, and the extent of data collected and shared is identified. Binary classifications are implemented for information central to user privacy, for example whether data is shared with third parties or whether cookies are stored on a web browser. In implementing question answering, beneficially natural language processing is applied to data privacy policy documents to answer straight forward questions, and transfer learning is implemented via pre-trained question answering models.

Figure 3:
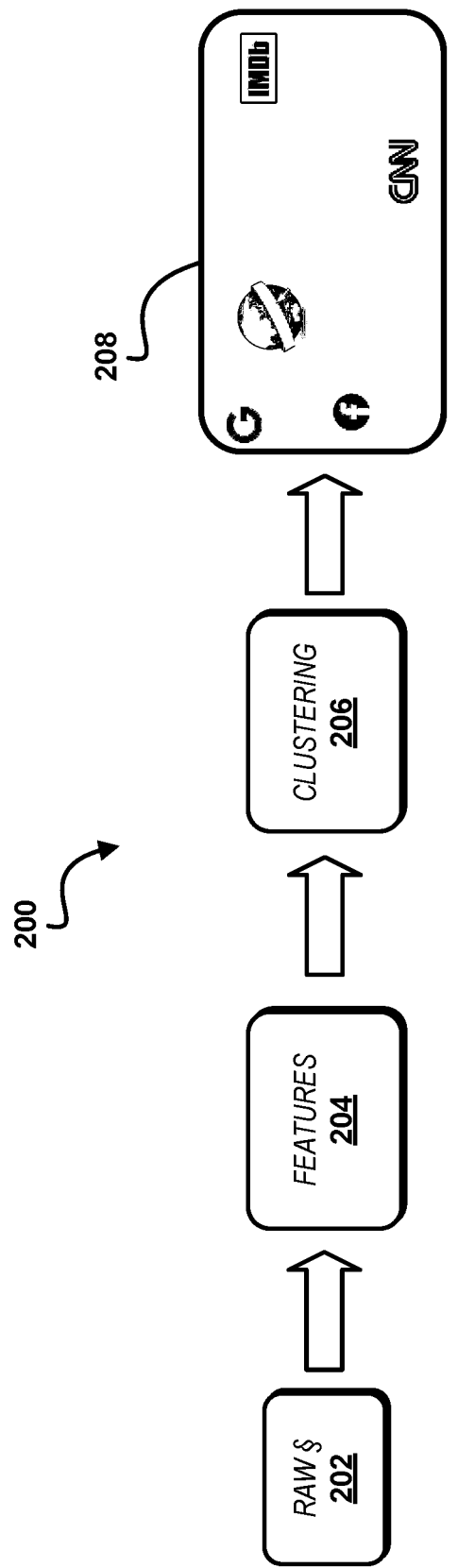
FIG. 3 shows an exemplary data flow for generating a data privacy policy map on which network resource access controls can be based.

Referring to FIG. 3, a process diagram 200 shows an exemplary data flow for generating a data privacy policy map 208. Features 204 are extracted by the modeling engine 22 or the privacy agent 14 based on raw text 202 of accessed and downloaded data privacy policies. Features 204 can include word counts, n-grams, word vectors (e.g., trained on a data privacy policy corpus), and document structures. A clustering process 206 is used in rendering the data privacy policy map 208.

High level feature extraction is performed by the modeling engine 22, or alternatively the privacy agent 14, to implement the clustering process 206 via topic modeling, sentiment analysis, classification, and similarity measures. Topic modeling is implemented to identify topics in a particular data privacy policy or sections thereof. Sentiment analysis is implemented to identify, along multiple dimensions, privacy levels of a particular data privacy policy or sections thereof, which multiple dimensions beneficially coincide with identified topics of the particular data privacy policy or sections thereof. Classification is implemented to identify categories of data sharing, methods of collection, and types of data (e.g., names, addresses, location, or other classes of personally identifiable information) of a particular data privacy policy or sections thereof. Similarity measures are implemented based on low level features including for example word count, n-gram count, and summary vectors.

The clustering process 206 is enabled by one or more trained and applied models which can include for example a decision tree algorithm, random forest algorithm, convolution neural network ("CNN"), or a long short-term memory artificial recurrent neural network ("LSTM RNN"). Decision tree and random forest algorithms are especially suited for classification tasks. An LSTM RNN can employ deep learning architecture and is well suited for receiving inputs of sequential or time series data.

The topic modeling process includes inputting text from particular paragraphs or sections of a data privacy policy into a model, beneficially an LSTM based neural architecture, to produce an inferred topic label. The LSTM based neural architecture beneficially implements a set of embedding vectors that are trained on a corpus of data privacy policies. Alternatively, a bag of words approach can be used to train decision trees for the task of producing a topic label. Beneficially, the privacy agent 14 via the user interface 56 is enabled to show sections of an analyzed data privacy policy including labels and highlights based on topics and data categories relevant to a particular user based on the particular user's privacy preferences, for example as shown by the third exemplary interactive display 160 of FIG. 2C.

Figure 4A:
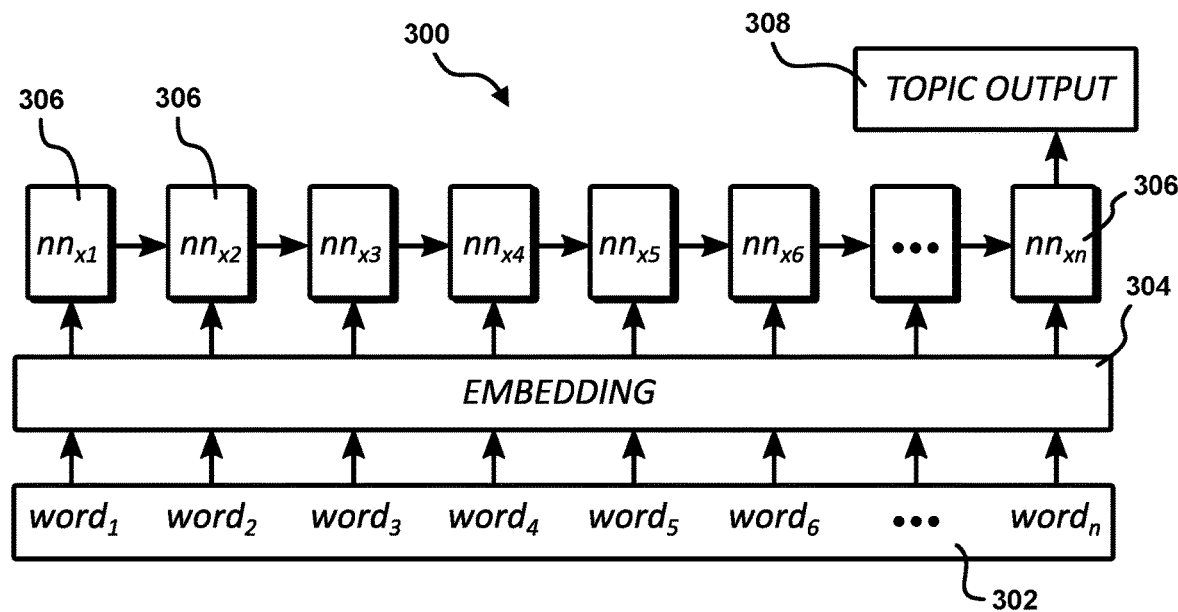
FIG. 4A is a diagram figuratively showing a classifier in the form of an artificial neural network for identifying topics described in a data privacy policy or section thereof.

Referring to FIG. 4A, an exemplary classifier in the form of a first recurrent neural network ("RNN") 300 is shown useful for identifying topics described in a data privacy policy or section thereof. Alternatively, other classifier types can be implemented such as Naïve Bayes, logistic regression, decision tree, boosted tree, support vector machine, convolutional neural network, nearest neighbor, dimensionality reduction algorithm, or gradient boosting algorithm classifiers. The first RNN 300 includes an input layer 302, an embedding layer 304, hidden nodes 306, and a topic output 308. The input layer 302 includes ordered words (word$_1$, word$_2$, . . . word$_n$) extracted from a data privacy policy accessed by the privacy manager 20 via the policy scraper 34 or accessed by the privacy agent 14 via a web browser 50. The ordered words can include one or more sentences, one or more sentence fragments, or one or more paragraphs. The first recurrent neural network ("RNN") 300 can be run for example by the modeling engine 22 of the privacy manager 20 based on data privacy policy data received from the policy scraper 34 or privacy agent 14. The embedding layer 304 creates vector representations of the input words. The hidden nodes 306 sequentially implement neural network algorithms (nnx$_1$, nnx$_2$, . . . nnx$_n$) on vectorized words providing feedback to subsequent nodes 306 to generate the topic output 308. The topic output 308 includes a topic described in a particular section of an accessed data privacy policy, which topic can include for example data sharing, data collection and storage, data use, or data requirements.

Figure 4B:
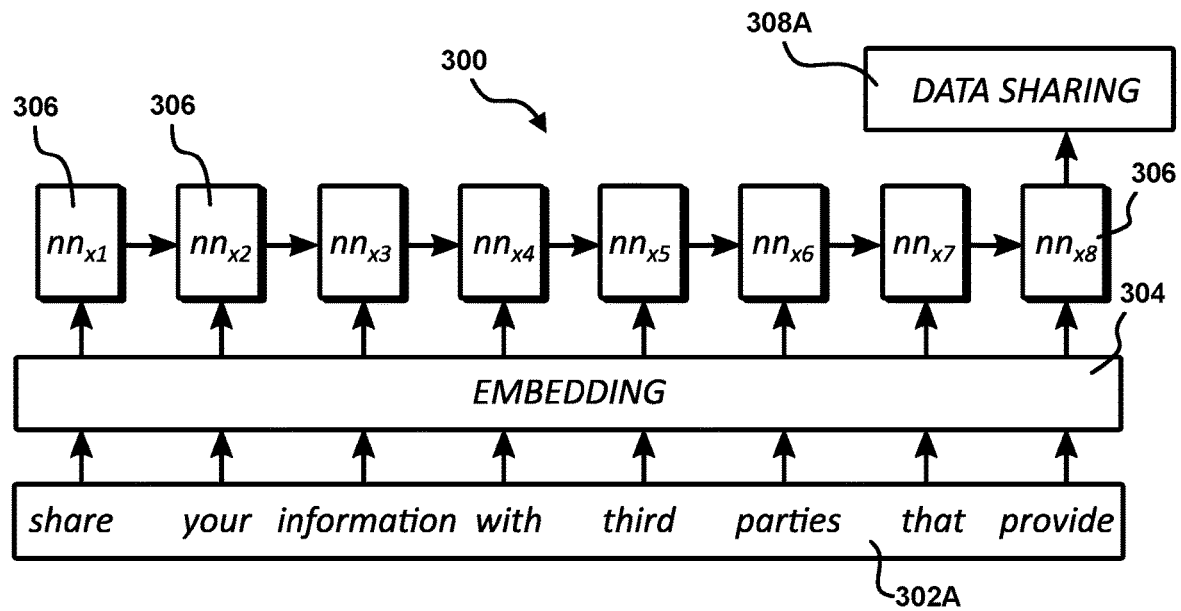
FIGS. 4B-4D are diagrams figuratively showing example implementations of the classifier of FIG. 4A.

Referring to FIG. 4B, an exemplary implementation of the first RNN 300 is shown in which the sentence fragment "share your information with third parties that provide" is input as an input layer 302A, and the topic output 308A is determined as "data sharing" by the first RNN 300. The first RNN 300 can be trained automatically for example by designating particular predefined keywords or key phrases as corresponding to a specified topic output, and using the sentences and phrases near in location to the predefined keywords or key phrases as the classifier inputs. For example, a paragraph in a particular data privacy policy including the word "share" can be designated as "data sharing", and other phrases or sentences near in location to the word "share" in the particular data privacy policy can be input to the first RNN 300 to train for the "data sharing" output 308A.

Figure 4C:
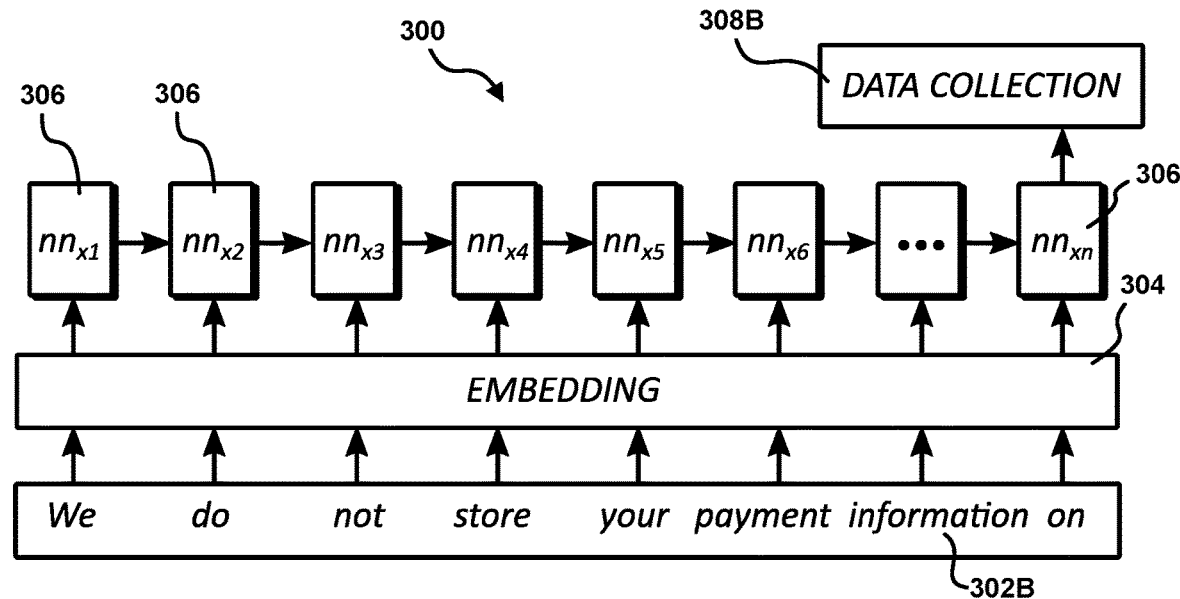

Referring to FIG. 4C, another exemplary implementation of the first RNN 300 is shown in which the sentence fragment "We do not store your payment information on" is input as an input layer 302B, and the topic output 308B is determined as "data collection" by the first RNN 300. As indicated above, the first RNN 300 can be trained automatically for example by designating particular predefined keywords or key phrases as corresponding to a specified topic output, and using the sentences and phrases near in location to the predefined keywords or key phrases as the classifier inputs. For example, a communication in a particular data privacy policy including the word "collect" can be designated as "data collecting", and other phrases or sentences near in location to the word "collect" in the particular data privacy policy can be input to the first RNN 300 to train for the "data collecting" output 308B.

Figure 4D:
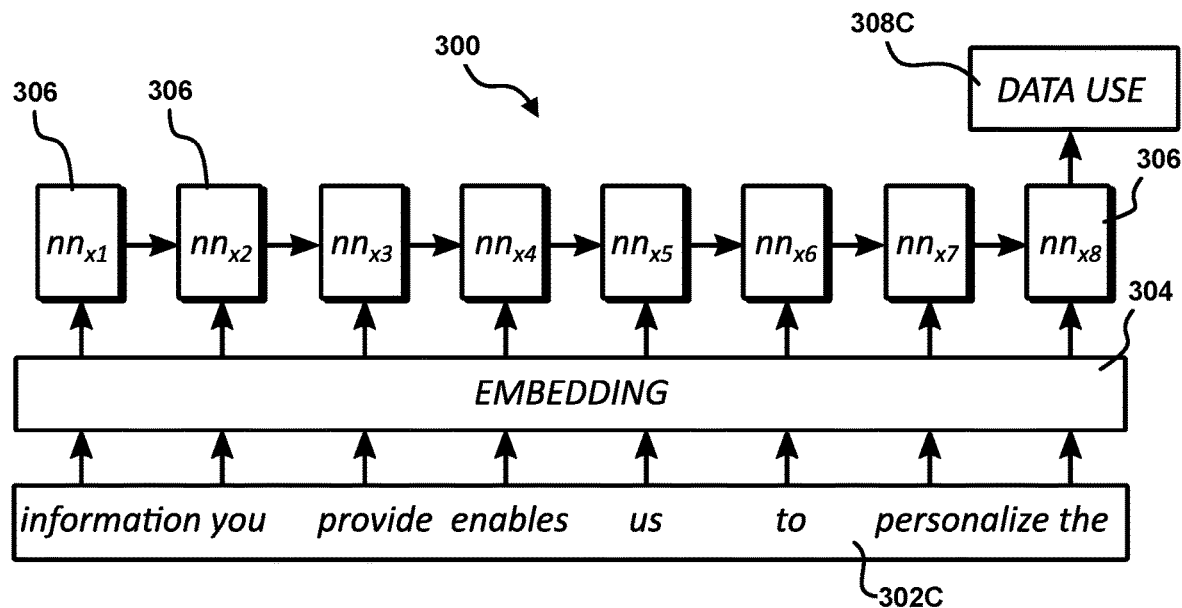

Referring to FIG. 4D, another exemplary implementation of the first RNN 300 is shown in which the sentence fragment "information you provide enables us to personalize the" is input as an input layer 302C, and the topic output 308C is determined as "data use" by the first RNN 300. As indicated above, the first RNN 300 can be trained automatically for example by designating particular predefined keywords or key phrases as corresponding to a specified topic output, and using the sentences and phrases near in location to the predefined keywords or key phrases as the classifier inputs. For example, a sentence or phrase in a particular data privacy policy including the word "use" can be designated as "data use", and other phrases or sentences near in location to the word "use" in the particular data privacy policy can be input to the first RNN 300 to train for the "data use" output 308C.

Figure 5A:
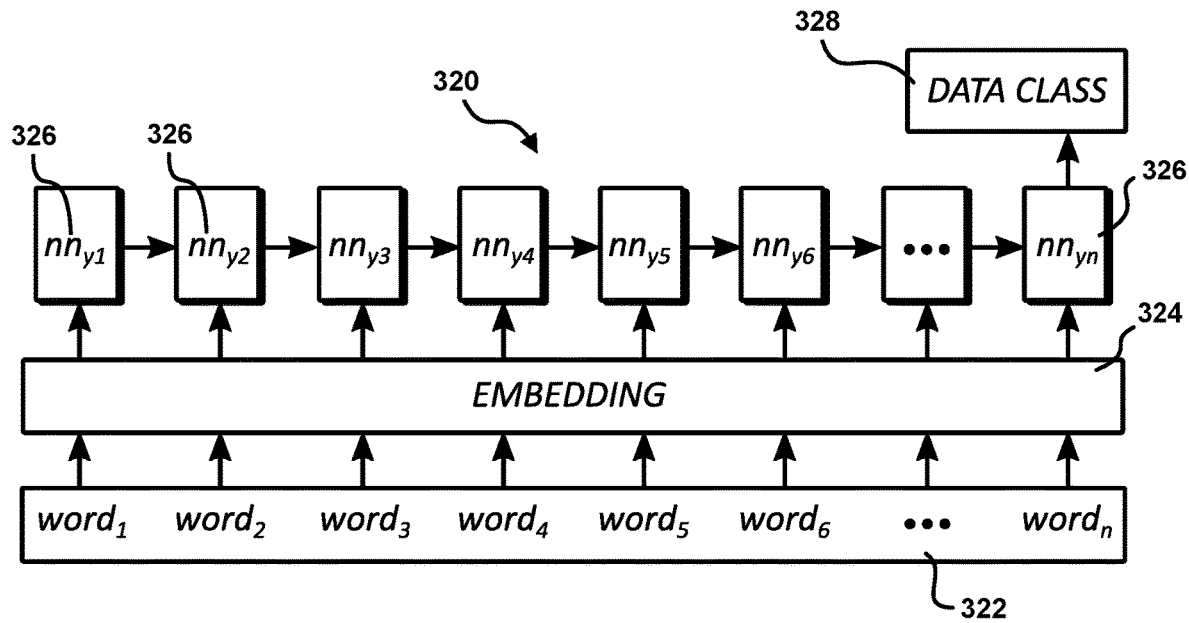
FIG. 5A is a diagram figuratively showing a classifier in the form of an artificial neural network for identifying classes of data described in a data privacy policy or section thereof.

Referring to FIG. 5A, an exemplary classifier in the form of a second recurrent neural network ("RNN") 320 is shown useful for identifying classes of data such as names, addresses, location, and other personally identifiable information ("PII") described in a data privacy policy or section thereof. Alternatively, other classifier types can be implemented such as Naïve Bayes, logistic regression, decision tree, boosted tree, support vector machine, convolutional neural network, nearest neighbor, dimensionality reduction algorithm, or gradient boosting algorithm classifiers. The second RNN 320 includes an input layer 322, an embedding layer 324, hidden nodes 326, and a data class output 328. The input layer 322 includes ordered words (word$_1$, word$_2$, . . . word$_n$) extracted from a data privacy policy accessed by the privacy manager 20 via the policy scraper 34 or accessed by the privacy agent 14 via a web browser 50. The ordered words can include one or more sentences, one or more sentence fragments, or one or more paragraphs. The second recurrent neural network ("RNN") 320 can be run for example by the modeling engine 22 of the privacy manager 20 based on data privacy policy data received from the policy scraper 34 or privacy agent 14. The embedding layer 324 creates vector representations of the input words. The hidden nodes 326 sequentially implement neural network algorithms (nn$_{y1}$, nn$_{y2}$, nn$_{yn}$) on vectorized words providing feedback to subsequent nodes 326 to generate the data class output 328. The data class output 328 includes a class of data described in a particular section of an accessed data privacy policy, which as indicated above can include for example names, addresses, location, and other personally identifiable information ("PII").

Figure 5B:
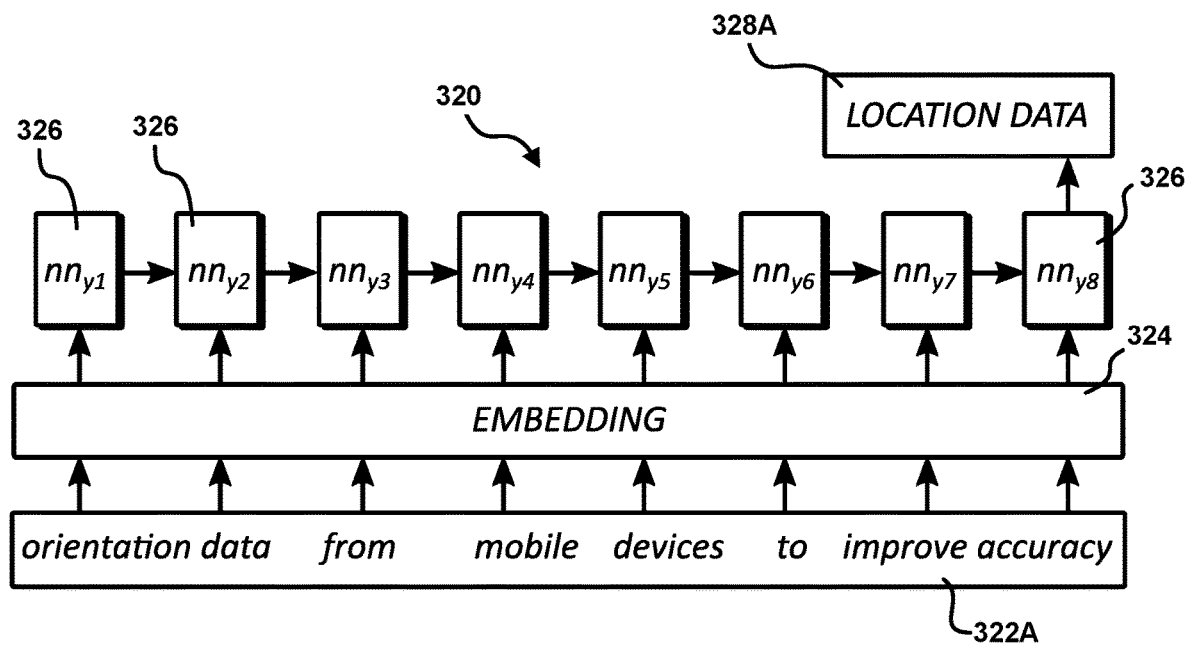
FIG. 5B is a diagram figuratively showing an example implementation of the classifier of FIG. 5A.

Referring to FIG. 5B, an exemplary implementation of the second RNN 320 is shown in which the sentence fragment "orientation data from mobile devices to improve accuracy" is input as an input layer 322A, and the data class output 328A is determined as "location data" by the second RNN 320. The second RNN 320 can be trained automatically for example by designating particular predefined keywords or key phrases as corresponding to a specified data class output, and using the sentences and phrases near in location to the predefined keywords or key phrases as the classifier inputs. For example, a sentence or phrase in a particular data privacy policy including the word "GPS" can be designated as "location data", and other phrases or sentences near in location to the word "GPS" in the particular data privacy policy can be input to the second RNN 320 to train for the "location data" output 328A.

As indicated above, sentiment analysis is performed by the modeling engine 22, or alternatively the privacy agent 14 in implementing the clustering process 206. A privacy sentiment level of individual data privacy policy sections and an overall privacy sentiment level of an entire data privacy policy can be determined based on an analysis of the entire data privacy policy and user preferences. Beneficially, the sentiment analysis is performed after topic modeling. A privacy sentiment level is determined for each modeled section as determined by the topic modeling, which sentiment level which can be used for measuring similarity of data privacy policies.

Beneficially, privacy sentiment level for each section of a data privacy policy is assigned a raw score. The raw score is beneficially based on decision trees or an LSTM-based model with pre-trained embeddings as inputs. Based on the topics in each section, an overall score for the data privacy policy is determined by weighting the importance of each topic to the user as determined by a user's explicit or implied privacy preferences. Explicit privacy preferences can be determined for example by direct queries to the user, and implicit privacy preferences can be determined for example based on the user's monitored acceptance of terms of other data privacy policies, which information can be gathered by the privacy agent 14 via communication with the web browsers 50 and local applications 52. Low scoring sections of a data privacy policy can for example be highlighted to a user in the user interface 56. Alternatively, low and high scoring sections of a data privacy policy can be highlighted to a user, for example as shown in the third exemplary interactive display 160 of FIG. 2C displaying the data privacy policy 162.

Similarity measures can be implemented in the clustering process 206 by determining a cosine similarity of privacy sentiment along different dimensions for different data privacy policies, the different dimensions corresponding for example to different topics of data privacy policies modeled by the modeling engine 22. In another aspect, similarity measures can be implemented in the clustering process 206 by determining cosine similarity of low level features including for example word count, n-gram count, and summary vectors of the different data privacy policies.

Figure 6A:
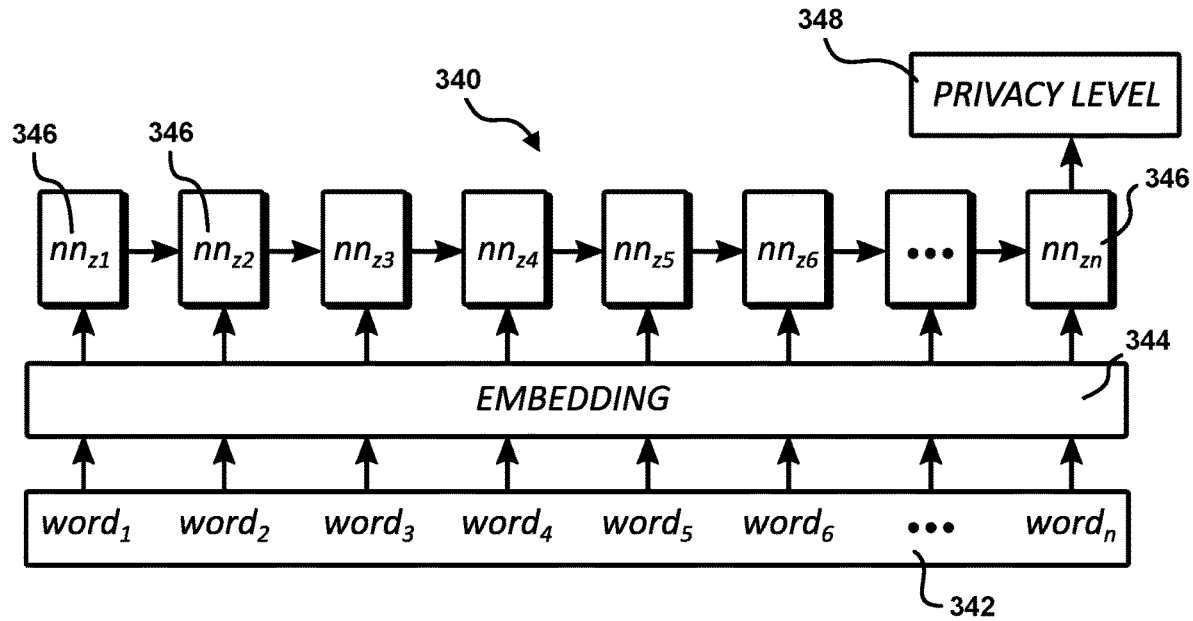
FIG. 6A is a diagram figuratively showing an estimator in the form of an artificial neural network for determining a privacy sentiment level score of a data privacy policy or section thereof or topic thereof.

Referring to FIG. 6A, an exemplary estimator in the form of a third recurrent neural network ("RNN") 340 is shown useful for determining a privacy sentiment level score of a data privacy policy or section thereof or topic thereof. Alternatively, other estimator types can be implemented such as linear regression, Naïve Bayes, convolutional neural network, nearest neighbor, or gradient boosting algorithm estimators. The third RNN 340 includes an input layer 342, an embedding layer 344, hidden nodes 346, and a privacy sentiment level score output 348. The input layer 342 includes ordered words ($word_1$, $word_2$, $word_n$) extracted from a data privacy policy accessed by the privacy manager 20 via the policy scraper 34 or accessed by the privacy agent 14 via a web browser 50. The ordered words can include one or more sentences, one or more sentence fragments, or one or more paragraphs. The third RNN 340 can be run for example by the modeling engine 22 of the privacy manager 20 based on data privacy policy data received from the policy scraper 34 or privacy agent 14. The embedding layer 344 creates vector representations of the input words. The hidden nodes 346 sequentially implement neural network algorithms ($nn_{z1}$, $nn_{z2}$, ... $nn_{zn}$) on vectorized words providing feedback to subsequent nodes 346 to generate the privacy sentiment level score output 348. The privacy sentiment level score outputs 348 for a plurality of sections are beneficially used to determine an overall privacy level of a particular data privacy policy or a particular topic within the particular data privacy policy. The privacy sentiment level score outputs 348 for a plurality of sections, when used in determining an overall privacy level of a particular data privacy policy can be weighted based on the importance to a user of topics respectively corresponding to the privacy sentiment level score outputs 348. For example, a particular privacy sentiment level score output 348 can correspond to a particular section of a particular data privacy policy corresponding to a particular topic, which topic is of high importance to the user, and as such that privacy sentiment level score output 348 is weighted highly in determining an overall privacy level of the particular data privacy policy.

Figure 6B:
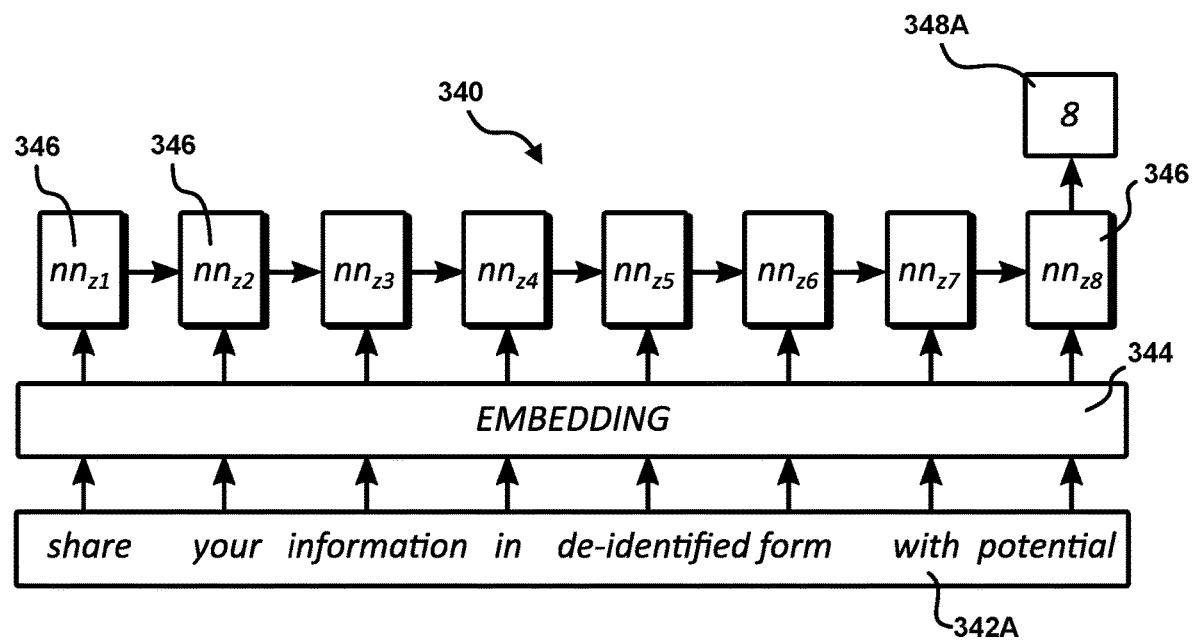
FIG. 6B is a diagram figuratively showing an example implementation of the estimator of FIG. 6A.

Referring to FIG. 6B, an exemplary implementation of the third RNN 340 is shown in which the sentence fragment "share your information in de-identified form with potential" from an analyzed data privacy policy is input as an input layer 342A, and the privacy sentiment level score output 348A is determined as "8" on a scale of 1 through 10 by the third RNN 340. The third RNN 340 can be trained automatically for example by designating particular predefined keywords or key phrases as corresponding to a specified privacy sentiment level score, and using the sentences and phrases near in location to the predefined keywords or key phrases as the estimator inputs. For example, a sentence or phrase in a particular data privacy policy including the phrase "is shared" a particular number of times can be designated as privacy sentiment level score "8", and other phrases or sentences near in location to the phrase "is shared" in the data privacy policy can be input to the third RNN 340 to train for the "8" output.

Policy maps generated for display to a user, for example the exemplary privacy policy map 102 shown in FIGS. 2A and 2B, beneficially include well defined axes in two or three dimensions based on two or three identifiable features or themes. Features or themes can include topics or classifications for example identified through application of the herein described classifiers to generate high dimensional feature vectors. Principal component analysis ("PCA") is beneficially applied to such high dimensional feature vectors to generate a two or three dimensional representation used in the mapping. Vectors to which PCA is applied can contain low level count features (e.g., word counts, n-gram counts, summary vectors) as well as high level extracted features (e.g. topic, sentiment level, classification). Policy maps are beneficially personalized based on user preferences. Features can be weighted by user privacy preferences, and weights can be set by querying a user about their privacy preferences and generating weights corresponding to features based on a user's answers. Alternatively, weights can be learned based on a user's actions, for example websites visited by the user or data privacy policies accepted by the user, as tracked by the privacy agent 14.

Websites and platforms whose data privacy policies are used for comparison in a policy map beneficially include websites or platforms known to a user as determined by the privacy agent 14. Referring to the exemplary privacy policy map 102, the mapped platform privacy indications 106, 108, 110, 112 of the various content and social media platforms can be displayed responsive to a user's access of the platforms via web browsers 50 or applications 52, as tracked by the privacy agent 14 on a computing device 12. A platform privacy indication can for example represent a website frequently visited by a user of a computing device 12, a website where the user has a registered account, or a website the user has frequently visited or has an account and has agreed to the data privacy policy of the website. Alternatively, platform privacy indications (e.g., mapped platform privacy indications 106, 108, 110, 112) can represent websites or applications in a same category as a website or application being analyzed for privacy understanding and represented by a new platform indication (e.g., new platform privacy indication 104). Platform privacy indications can alternatively be based on industry standards set by similar websites. Web aggregator websites can be used to determine websites in the same category as a website or application having its data privacy policy analyzed as described herein.

Data privacy policies of websites and platforms of well-known companies or trusted websites or platforms are beneficially used for comparison in a policy map. Such websites or platforms, or the companies which enable them, are beneficially known for good privacy standards, data privacy policies compliant with General Data Protection Regulation ("GDRP") or other privacy regulation, or otherwise practice user friendly data privacy policies.

Figure 7:
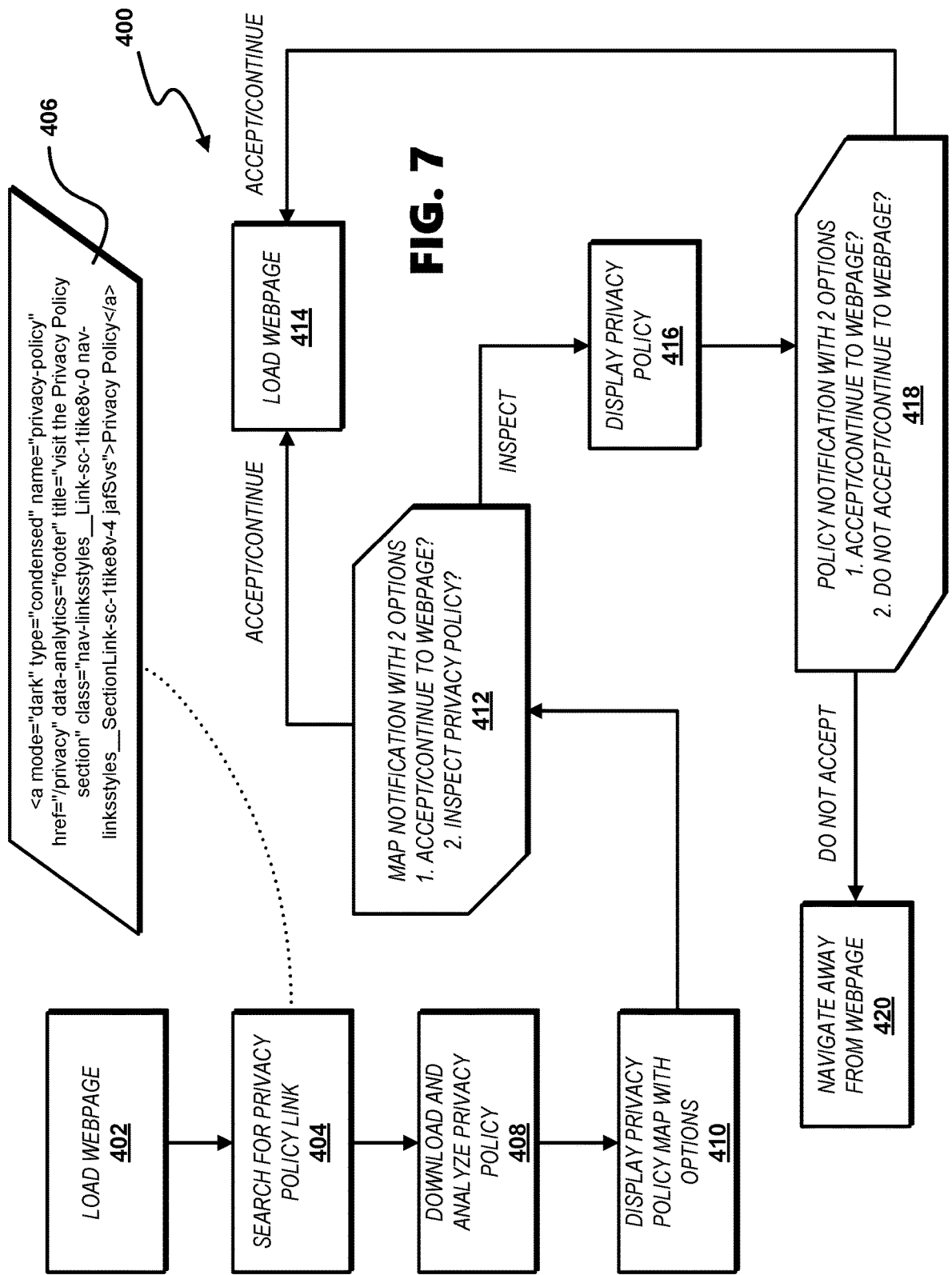
FIG. 7 is a diagram showing a webpage access control process.

Referring to FIG. 7, a webpage access control process 400 is shown. The process 400 is described with reference to the components of the system 10 shown in FIG. 1, including for example the computing device 12, the processor-enabled privacy manager 20, and the privacy agent 14. Alternatively, the process 400 can be performed via other suitable systems.

In a step 402, a web browser 50 of a computing device 12 loads a webpage of a website based on action by a user of the computing device 12. A web browser plugin for example in the form of the privacy agent 14 searches for and discovers a link to a data privacy policy in the loaded webpage (step 404), for example based on coding 406. The web browser plugin downloads a data privacy policy via the discovered link and analyzes the data privacy policy (step 408). A data privacy policy map is displayed (step 410) in the user interface 56 of the computing device 12, for example in the form of the exemplary privacy policy map 102 of FIGS. 2A and 2B. In a step 412, options in the form of interactive queries are provided via the user interface 56 including 1) to accept and continue to the webpage and 2) to inspect the data privacy policy, for example as shown in the second exemplary interactive display 150 of FIG. 2B which includes the "accept & continue" button 140 and the "inspect policy button" 152. If the user of the computing device 12 selects to accept and continue to the webpage, the web browser plugin enables the web browser 50 to load the webpage (step 414) and beneficially also allows access to other webpages of the corresponding website. If the user selects to inspect the data privacy policy, the data privacy policy is displayed via the user interface 56 by the web browser plugin with relevant sections or paragraphs of the data privacy policy highlighted (step 416), beneficially based on user privacy preferences. In a step 418, options in the form of interactive queries are provided via the user interface 56 including 1) to accept and continue to the webpage and 2) to not accept and continue to the webpage, for example as shown in the third exemplary interactive display 160 of FIG. 2C which includes the "accept & continue" button 140 and the "do not accept button" 142. If the user of the computing device 12 selects to accept and continue to the webpage, the web browser plugin enables the web browser 50 to load the webpage (step 414) and beneficially also allows access to other webpages of the corresponding website. If the user of the computing device 12 selects to not accept and continue to the webpage, the web browser plugin directs the web browser 50 to navigate away from the webpage (step 420) and beneficially also blocks future access to the webpage or to other webpages of the corresponding website.

Figure 8:
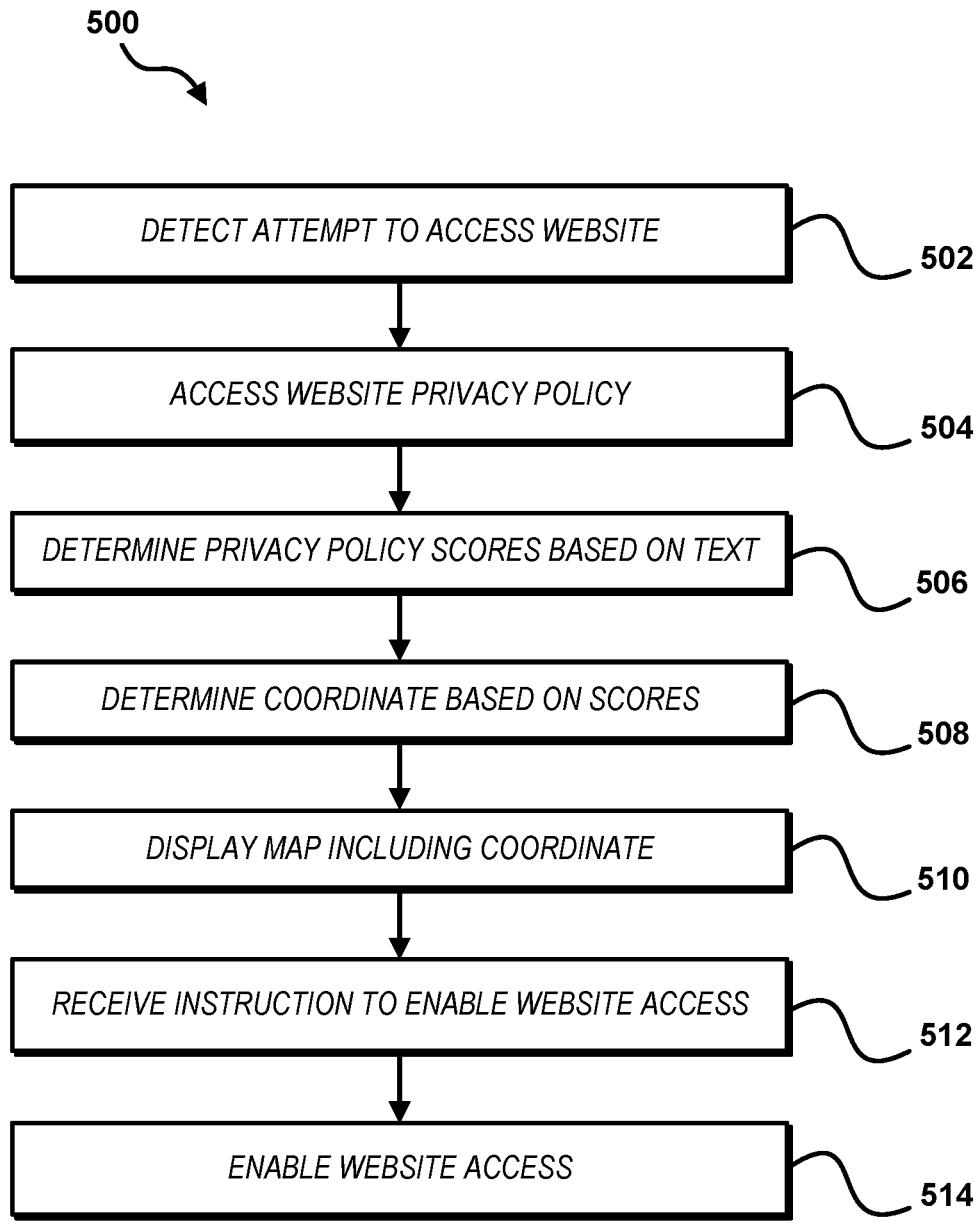
FIG. 8 is a diagram showing a method for enabling website access.

Referring to FIG. 8, a method 500 for enabling or disabling use of a website on a computing device is shown. The method 500 is described with reference to the components of the system 10 shown in FIG. 1, including for example the computing device 12, the processor-enabled privacy manager 20, and the privacy agent 14. Alternatively, the method 500 can be performed via other suitable systems.

In a step 502, an attempt to access a particular website by a computing device 12 via a network is detected. The particular website includes one or more webpages beneficially under the same domain. The attempt to access the particular website can be detected for example by detecting a webpage of the particular website loaded by a web browser 50 executed by the computing device 12. Alternatively, detecting the attempt to access the particular website can include detecting a Uniform Resource Locator ("URL") of a webpage of the particular website which is input to a web browser 50 executed by the computing device 12. The attempt to access the particular website can be detected via a plugin in a web browser 50 executed by the computing device 12, which plugin can be enabled by or be in the form of the privacy agent 14.

A particular data privacy policy is accessed for the particular website (step 504). Beneficially, a particular webpage loaded by the web browser 50 of the computing device 12 is searched based on data received via the network, and a link to the particular data privacy policy is detected in the webpage loaded by the browser to access the particular data privacy policy. Further, the accessing of the particular data privacy policy can include downloading the particular data privacy policy to the computing device 12, for example via the web browser plugin. Scores of the particular data privacy policy are determined based on text of the particular data privacy policy (step 506). The scores of the particular data privacy policy are beneficially scores of a particular data privacy policy of the particular website corresponding to particular sections or paragraphs of the particular data privacy policy. An LSTM RNN estimator, for example the third RNN 340 of FIG. 6A, can be applied to the text of the particular data privacy policy to determine the scores of the particular data privacy policy.

A particular multidimensional coordinate is determined based on the scores (step 508). The multidimensional coordinate can be determined for example based on the scores of the particular data privacy policy via a web browser plugin enabled by or in the form of the privacy agent 14. A map comprising the particular multidimensional coordinate is displayed via the computing device 12 (step 510). The map, for example the exemplary privacy policy map 102 of FIGS. 2A and 2B, can be displayed via the web browser 50 as enabled by a web browser plugin. Beneficially, text of the particular data privacy policy is analyzed to identify a plurality of topics comprising one or more of data sharing permissions, data collection permissions, or data requirements of the particular website. An LSTM RNN classifier, for example the first RNN 300 of FIG. 4A, can be applied for example to the text of the particular data privacy policy to determine the plurality of topics. The scores of the particular data privacy policy are determined as particular multidimensional vectors corresponding to the plurality of topics, wherein each of the plurality of topics corresponds to a dimension, and the particular multidimensional coordinate is determined based on the particular multidimensional vectors.

An instruction is received from a user via the computing device 12 to enable accessing of the particular website (step 512). An interactive query can be provided via a plugin in the web browser 50 of the computing device 12 asking whether the user permits access to the particular website, and the instruction can be received from the user via the computing device 12 in response to the interactive query, for example via the "accept & continue" button 140 of the first exemplary interactive display 100, the second exemplary interactive display 150, or the third exemplary interactive display 160. Accessing of the particular website is enabled in response to the instruction from the user (step 514). The enabling of the accessing of the particular website beneficially includes one or more of enabling downloading via the network Hypertext Markup Language ("HTML") code of a particular webpage of the particular website or enabling loading of the particular webpage of the particular website in a web browser 50 executed by the computing device 12.

In addition to accessing the particular data privacy policy, beneficially a plurality of data privacy policies, in addition to the particular data policy, of a plurality of websites, in addition to the particular website, are accessed via the network. Scores of the plurality of data privacy policies are determined based on text of the plurality of data privacy policies. A plurality of multidimensional coordinates are determined based on the scores of the plurality of data privacy policies, each of the plurality of multidimensional coordinates corresponding to one of the plurality of websites. The map is generated and displayed further including the plurality of multidimensional coordinates in addition to the particular multidimensional coordinate, providing a user with a basis for comparison as shown by the exemplary privacy policy map 102.

Text of the plurality of data privacy policies is analyzed to identify a plurality of topics including one or more of data sharing permissions, data collection permissions, or data requirements. Further, text of the particular data privacy policy is analyzed to identify the plurality of topics. The scores of the plurality of data privacy policies are determined as a plurality of multidimensional vectors corresponding to the plurality of topics, and the scores of the particular data privacy policy are determined as particular multidimensional vectors corresponding to the plurality of topics. The plurality of multidimensional coordinates are determined based on the plurality of multidimensional vectors, and the particular multidimensional coordinate is determined based on the particular multidimensional vectors. Cosine similarities of the scores of the plurality of data privacy policies and the scores of the particular data privacy policy can be determined along different dimensions, and the plurality of multidimensional coordinates and the particular multidimensional coordinate can be determined further based on the cosine similarities. A long short-term memory recurrent neural network ("LSTM RNN") classifier (e.g., the first RNN 300 of FIG. 4A) can be applied to the plurality of data privacy policies to identify the plurality of topics, which LSTM RNN can be trained on a data privacy policy corpus. Alternatively, a decision tree classifier can be applied to the plurality of data privacy policies to identify the plurality of topics or to determine the scores of the plurality of data privacy policies. Likewise, an LSTM RNN classifier or a decision tree classifier can be applied to the particular data privacy policy to identify the plurality of topics or to determine the scores of the particular data privacy policy.

Determining the plurality of multidimensional coordinates and the particular multidimensional coordinate beneficially includes analyzing text of the plurality of data privacy policies to identify a plurality of sections of the plurality of data privacy policies and analyzing text of the particular data privacy policy to identify particular sections of the particular data privacy policy. The scores of the plurality of data privacy policies are determined as a plurality of multidimensional vectors corresponding to the plurality of sections, and the scores of the particular data privacy policy are determined as particular multidimensional vectors corresponding to the particular sections. The plurality of multidimensional coordinates are determined based on the plurality of multidimensional vectors, and the particular multidimensional coordinate is determined based on the particular multidimensional vectors. Beneficially, cosine similarities of the scores of the plurality of data privacy policies and the scores of the particular data privacy policy can be determined along different dimensions (e.g., corresponding to different topics), and the plurality of multidimensional coordinates and the particular multidimensional coordinate can be determined further based on the cosine similarities.

As indicated above, text of the plurality of data privacy policies can be analyzed to identify a plurality of sections of the plurality of data privacy policies, and text of the particular data privacy policy can be analyzed to identify particular sections of the particular data privacy policy. In such implementation, determining the scores of the plurality of data privacy policies can include determining a certain score for each of the plurality of sections of the plurality of data privacy policies, and determining the scores of the particular data privacy policy can include determining a particular score for each of the particular sections of the particular data privacy policy. The identifying of the plurality of sections of the plurality of data privacy policies can include identifying topics including one or more of data sharing permissions, data collection permissions, or data requirements, for example by applying the first RNN 300 of FIG. 4A. Alternatively, the identifying of the plurality of sections of the plurality of data privacy policies can include identifying classes of data including one or more of user name, user address, or user location, for example by applying the second RNN 320 of FIG. 5A.

In generating and displaying the map according to the method 500, one or more of word counts, n-gram counts, or summary vectors of the plurality of data privacy policies can be determined, and one or more of word counts, n-gram counts, or summary vectors of the particular data privacy policy can be determined. A similarity of the one or more of the word counts, the n-gram counts, or the summary vectors of the plurality of data privacy policies and the one or more of the word counts, the n-gram counts, or the summary vectors of the particular data privacy policy can be determined, and the map can be generated and displayed further based on the similarity.

In another implementation of the method 500, a plurality of websites visited via the computing device 12 can be detected, for example via the privacy agent 14, the plurality of websites having a plurality of data privacy policies. Alternatively, a plurality of websites can be detected, for example via the privacy agent 14 or policy scraper 34, on which the user has an account and has confirmed acceptance to a plurality of data privacy policies of the plurality of websites. The plurality of data privacy policies of the plurality of websites can be accessed via the network, for example via a plugin in the form of the privacy agent 14 in the web browser 50 or the policy scraper 34. Scores of the plurality of data privacy policies can be determined based on text of the plurality of data privacy policies, and a plurality of multidimensional coordinates can be determined based on the scores of the plurality of data privacy policies, each of the plurality of multidimensional coordinates corresponding to one of the plurality of websites, wherein the map is generated and displayed to further include the plurality of multidimensional coordinates in addition to the particular multidimensional coordinate.

In another implementation of the method 500, indications of importance of a plurality of topics are received from the user for example via a user questionnaire enabled by the web application 28 or privacy agent 14, the plurality of topics including one or more of data sharing permissions, data collection permissions, or data requirements. Text of the particular data privacy policy is analyzed to identify the plurality of topics, and the scores of the particular data privacy policy are weighted based on the identified plurality of topics and the indications of importance of the plurality of topics from the user. Further, text of the particular data privacy policy can be analyzed to identify classes of data including one or more of user name, user address, or user location, and the scores of the particular data privacy policy can be weighted based on the identified classes of data.

In another implementation of the method 500, text of the particular data privacy policy is analyzed to identify particular sections of the particular data privacy policy, for example via the modeling engine 22, the identifying of the particular sections of the particular data privacy policy including identifying topics including one or more of data sharing permissions, data collection permissions, or data requirements. A request from the user to access the particular data privacy policy is received, for example via the second exemplary interactive display 150 displayed by the user interface 56, and the particular data privacy policy and indications of the particular sections of the particular data privacy policy are displayed via the computing device 12, for example via the third exemplary interactive display 160 displayed by the user interface 56.

Figure 9:
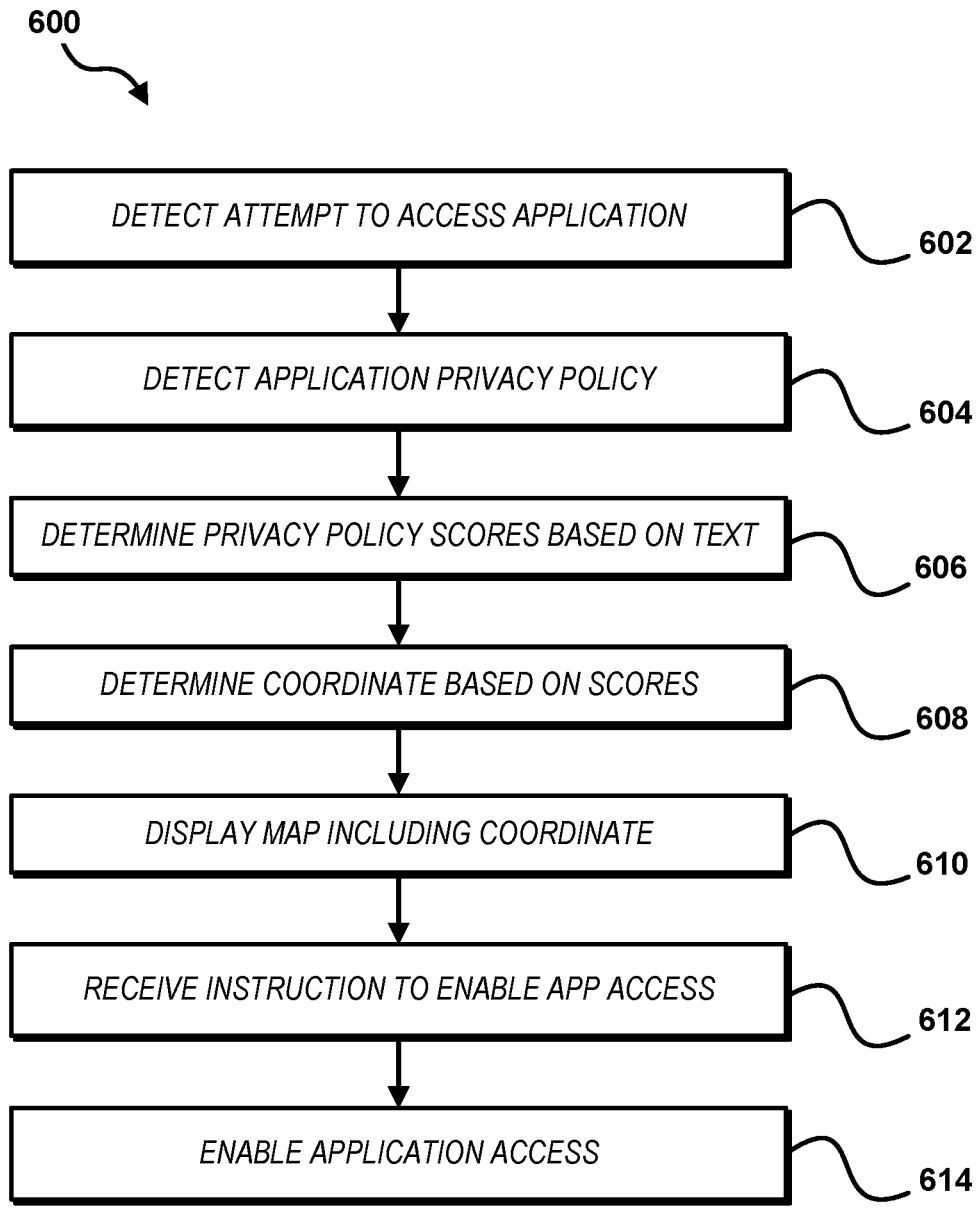
FIG. 9 is a diagram showing a method for enabling application access.

Referring to FIG. 9, a method 600 for enabling use of an application on a computing device is shown. The method 600 is described with reference to the components of the system 10 shown in FIG. 1, including for example the computing device 12, the processor-enabled privacy manager 20, and the privacy agent 14. Alternatively, the method 600 can be performed via other suitable systems.

In a step 602, an attempt to access a particular application via a computing device 12 is detected. The detecting of the attempt to access the particular application can include for example detecting a webpage loaded by a web browser 50 based on data received via a network. A particular data privacy policy for the particular application is detected via the network (step 604). Beneficially a webpage loaded by a web browser 50 of the computing device 12 is searched based on data received via the network, and a link to the particular data privacy policy is detected in the webpage loaded by the web browser 50 to access the particular data privacy policy. The accessing of the particular data privacy policy can include downloading the particular data privacy policy.

Scores of the particular data privacy policy are determined based on text of the particular data privacy policy (step 606). A particular multidimensional coordinate is determined based on the scores of the particular data privacy policy (step 608). A map comprising the particular multidimensional coordinate is displayed via the computing device 12 (step 610), for example the exemplary privacy policy map 102. An instruction is received from a user via the computing device 12 to enable accessing of the particular application (step 612), and accessing of the particular application is enabled in response to the instruction from the user (step 614).

In addition to accessing the particular data privacy policy, beneficially a plurality of data privacy policies of a plurality of applications are accessed via the network, and a plurality of scores of the plurality of data privacy policies are determined based on text of the plurality of data privacy policies. A plurality of multidimensional coordinates are determined based on the scores of the plurality of data privacy policies, each of the plurality of multidimensional coordinates corresponding to one of the plurality of applications, and the map is generated and displayed further including the plurality of multidimensional coordinates in addition to the particular multidimensional coordinate.

Figure 10:
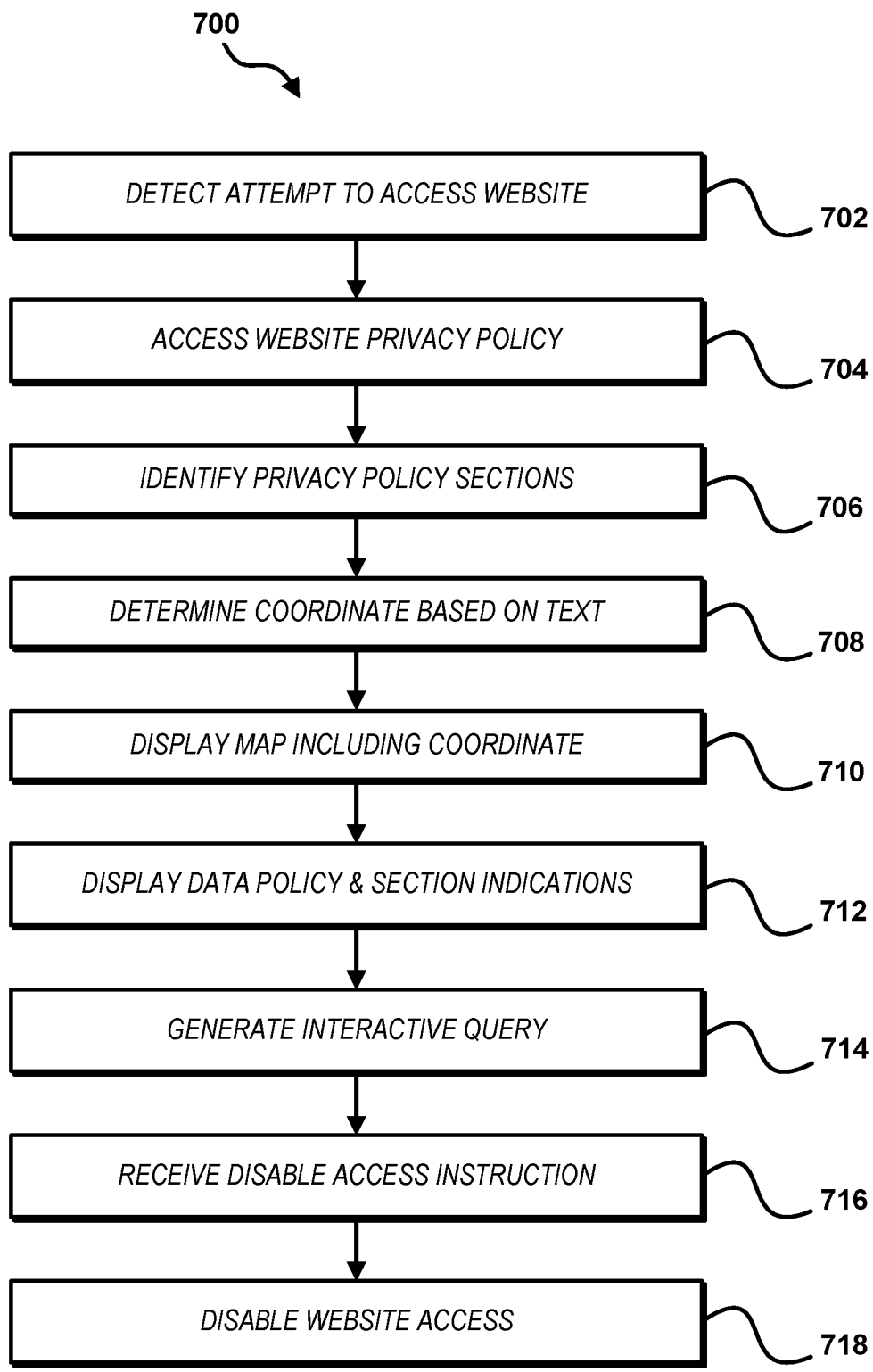
FIG. 10 is a diagram showing a method for disabling website access.

Referring to FIG. 10, a method 700 for enabling or disabling use of a website on a computing device is shown. The method 700 is described with reference to the components of the system 10 shown in FIG. 1, including for example the computing device 12, the processor-enabled privacy manager 20, and the privacy agent 14. Alternatively, the method 700 can be performed via other suitable systems.

In a step 702, an attempt to access a particular website is detected by a computing device 12 via a network. A particular data privacy policy for the particular website is accessed in response to detecting the attempt to access the particular website (step 704), and text of the particular data privacy policy is analyzed to identify particular sections of the particular data privacy policy, the identifying of the particular sections of the particular data privacy policy comprising identifying a plurality of topics of the particular data privacy policy (step 706). The identifying of the particular sections of the particular data privacy policy can further include identifying a plurality of classes of data of the particular data privacy policy.

A particular multidimensional coordinate is determined based on the text of the particular data privacy policy (step 708). A map including the particular multidimensional coordinate is displayed via the computing device 12 (step 710), for example the exemplary privacy policy map 102. The particular data privacy policy and indications of the particular sections of the particular data privacy policy are displayed via the computing device 12 (step 712). Beneficially, scores of each of the particular sections are determined based on the text of the particular data privacy policy, the scores including ratings of data permissions of the particular data privacy policy, and the scores of each of the particular sections are displayed via the computing device 12, for example in the manner shown by the third exemplary interactive display 160.

One or more interactive queries are generated via the computing device 12 in the user interface 56 for enabling the accessing of the particular website and disabling the accessing of the particular website (step 714). An instruction to disable the accessing of the particular website is received from a user via the computing device 12 via the one or more interactive queries (step 716). Generating the one or more interactive queries beneficially includes displaying via the computing device 12 an actuatable button for disabling the accessing of the particular website (e.g., the "do not accept" button 142) and an actuatable button for enabling the accessing of the particular website (e.g., the "accept & continue" button 140), wherein the instruction from the user via the computing device is received by detecting user actuation of the actuatable button for disabling the accessing of the particular website or user actuation of the actuatable button for enabling the accessing of the particular website. The accessing of the particular website is disabled in response to the instruction from the user (step 718), for example in response to user actuation of the actuatable button for disabling the accessing of the particular website. Alternatively, the accessing of the particular website can be enabled in response to the instruction from the user, for example in response to user actuation of the actuatable button for enabling the accessing of the particular website.

In implementing the method 700 indications of importance of the plurality of topics are beneficially received from a user of the computing device 12, the plurality of topics including one or more of data sharing permissions, data collection permissions, or data requirements. Scores of each of the particular sections are determined based on the text of the particular data privacy policy, the scores including ratings of data permissions of the particular data privacy policy. The scores of each of the particular sections are weighted based on the indications of importance of the plurality of topics, an overall score is generated based on the weighted scores, and the particular multidimensional coordinate is determined based on the overall score.

Figure 11:
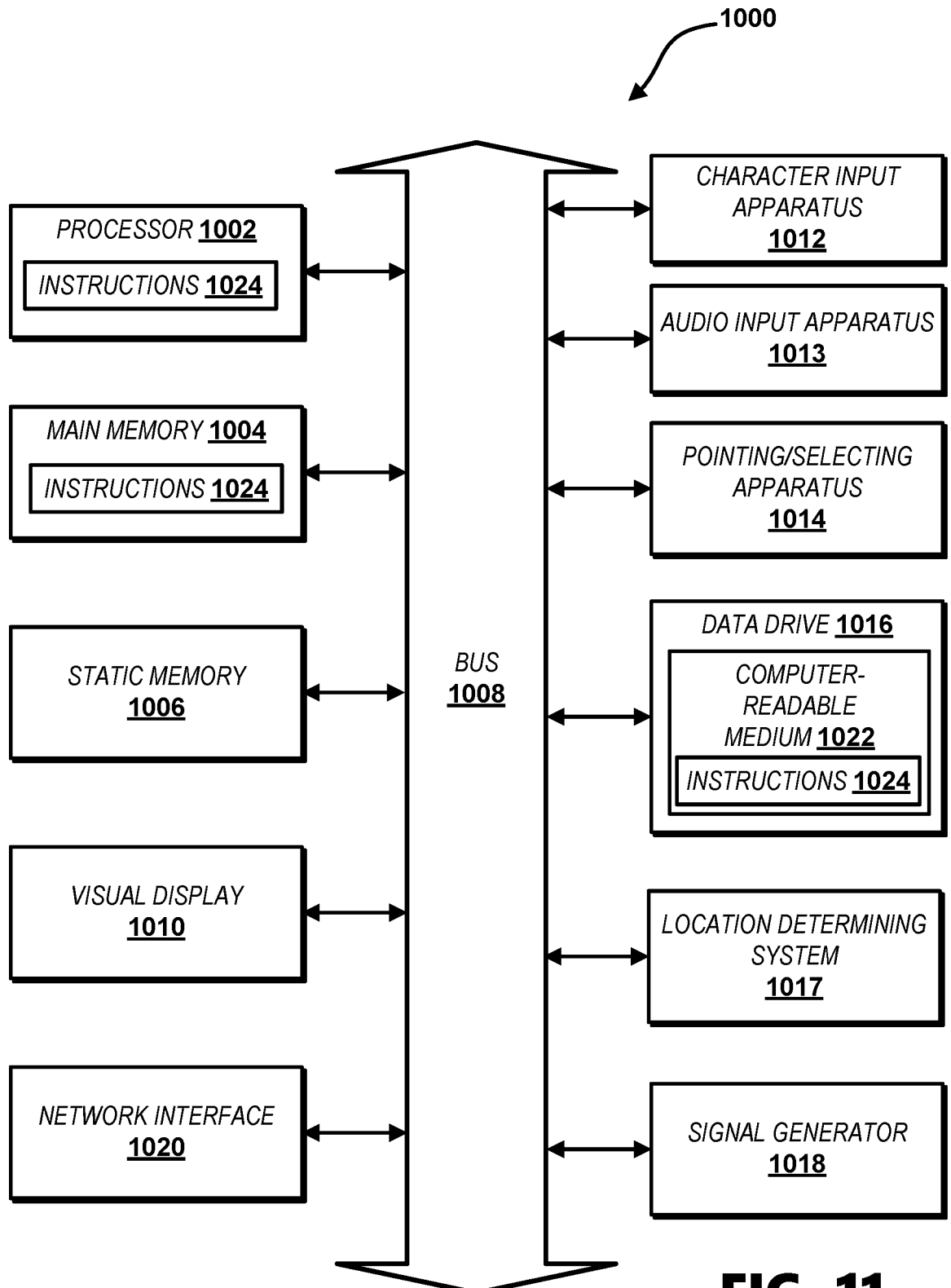
FIG. 11 is an illustrative computer system for performing described methods according to the illustrative embodiments.

FIG. 11 illustrates in abstract the function of an exemplary computer system 1000 on which the systems, methods and processes described herein can execute. For example, the computing device 12, privacy manager 20, web/app server 40, and application settings API 44 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 8, using a signal transmission medium via the network interface 1020 operating under one or more known transfer protocols, for example FTP, HTTP, or HTTPs. Examples of communication networks include a local area network (LAN), a wide area network (WAN), the Internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor. While embodiments have been described in detail above, these embodiments are non-limiting and should be considered as merely exemplary. Modifications and extensions may be developed, and all such modifications are deemed to be within the scope defined by the appended claims.

What is claimed is:

1. A method for enabling web site access comprising:
   detecting an attempt to access a particular web site by a computing device via a network, the particular website comprising at least one webpage;
   accessing a particular data privacy policy for the particular website;
   determining scores of the particular data privacy policy based on text of the particular data privacy policy, the text of the particular data privacy policy comprising at least one of a data sharing permission of the particular website, a data collection permission of the particular website, or a data requirement of the particular website;
   determining a particular multidimensional coordinate in at least two dimensions based on the scores of the particular data privacy policy;
   displaying via the computing device a map comprising the particular multidimensional coordinate as a particular indication in the at least two dimensions;
   receiving an instruction from a user via the computing device to enable accessing of the particular website; and
   enabling the accessing of the particular web site by the computing device in response to the instruction from the user.

2. The method of claim 1, further comprising:
   accessing a plurality of data privacy policies of a plurality of websites via the network;
   determining scores of the plurality of data privacy policies based on text of the plurality of data privacy policies, the text of the plurality of data privacy policies comprising at least one of data sharing permissions of the plurality of websites, data collection permissions of the plurality of websites, or data requirements of the plurality of websites;
   determining a plurality of multidimensional coordinates in the at least two dimensions based on the scores of the plurality of data privacy policies, each of the plurality of multidimensional coordinates corresponding to one of the plurality of websites; and
   generating and displaying the map further comprising the plurality of multidimensional coordinates as a plurality of indications in the at least two dimensions.

3. The method of claim 2, further comprising:
   analyzing the text of the plurality of data privacy policies to identify a plurality of topics comprising the at least one of the data sharing permissions of the plurality of websites, the data collection permissions of the plurality of websites, or the data requirements of the plurality of web sites;
   analyzing the text of the particular data privacy policy to identify the plurality of topics;
   determining the scores of the plurality of data privacy policies as a plurality of multidimensional vectors corresponding to the plurality of topics;
   determining the scores of the particular data privacy policy as particular multidimensional vectors corresponding to the plurality of topics;
   determining the plurality of multidimensional coordinates based on the plurality of multidimensional vectors; and
   determining the particular multidimensional coordinate based on the particular multidimensional vectors.

4. The method of claim 3, further comprising:
   determining cosine similarities of the scores of the plurality of data privacy policies and the scores of the particular data privacy policy along different dimensions; and
   determining the plurality of multidimensional coordinates and the particular multidimensional coordinate further based on the cosine similarities.

5. The method of claim 3, further comprising applying a long short-term memory recurrent neural network ("LSTM RNN") classifier to the plurality of data privacy policies to identify the plurality of topics, the LSTM RNN trained on a data privacy policy corpus.

6. The method of claim 3, further comprising applying a decision tree classifier to the plurality of data privacy policies to identify the plurality of topics.

7. The method of claim 2, further comprising applying a decision tree classifier to the text of the plurality of data privacy policies to determine the scores of the plurality of data privacy policies.

8. The method of claim 2, further comprising:
   analyzing the text of the plurality of data privacy policies to identify a plurality of sections of the plurality of data privacy policies;
   analyzing the text of the particular data privacy policy to identify particular sections of the particular data privacy policy;
   determining the scores of the plurality of data privacy policies as a plurality of multidimensional vectors corresponding to the plurality of sections;
   determining the scores of the particular data privacy policy as particular multidimensional vectors corresponding to the particular sections;
   determining the plurality of multidimensional coordinates based on the plurality of multidimensional vectors; and
   determining the particular multidimensional coordinate based on the particular multidimensional vectors.

9. The method of claim 8, further comprising:
   determining along different dimensions cosine similarities of the scores of the plurality of data privacy policies and the scores of the particular data privacy policy; and
   determining the plurality of multidimensional coordinates and the particular multidimensional coordinate further based on the cosine similarities.

10. The method of claim 2, further comprising:
analyzing the text of the plurality of data privacy policies to identify a plurality of sections of the plurality of data privacy policies; and
analyzing the text of the particular data privacy policy to identify particular sections of the particular data privacy policy; wherein
determining the scores of the plurality of data privacy policies comprises determining a certain score for each of the plurality of sections of the plurality of data privacy policies; and
determining the scores of the particular data privacy policy comprises determining a particular score for each of the particular sections of the particular data privacy policy.

11. The method of claim 10, the identifying of the plurality of sections of the plurality of data privacy policies comprising identifying topics comprising at least one of the data sharing permissions of the plurality of websites, the data collection permissions of the plurality of websites, or the data requirements of the plurality of websites.

12. The method of claim 10, the identifying of the plurality of sections of the plurality of data privacy policies comprising identifying classes of data comprising at least one of user name, user address, or user location.

13. The method of claim 2, further comprising:
determining at least one of word counts of the plurality of data privacy policies, n-gram counts of the plurality of data privacy policies, or summary vectors of the plurality of data privacy policies;
determining at least one of word counts of the particular data privacy policy, n-gram counts of the particular data privacy policy, or summary vectors of the particular data privacy policy;
determining a similarity of the at least one of the word counts, the n-gram counts, or the summary vectors of the plurality of data privacy policies and the at least one of the word counts, the n-gram counts, or the summary vectors of the particular data privacy policy; and
generating and displaying the map further based on the similarity.

14. The method of claim 1, further comprising applying an LSTM RNN classifier to the particular data privacy policy to determine the scores of the particular data privacy policy.

15. The method of claim 1, further comprising:
detecting a plurality of web sites visited via the computing device;
accessing a plurality of data privacy policies of the plurality of websites via the network;
determining scores of the plurality of data privacy policies based on text of the plurality of data privacy policies, the text of the plurality of data privacy policies comprising at least one of data sharing permissions of the plurality of websites, data collection permissions of the plurality of websites, or data requirements of the plurality of websites;
determining a plurality of multidimensional coordinates in the at least two dimensions based on the scores of the plurality of data privacy policies, each of the plurality of multidimensional coordinates corresponding to one of the plurality of websites; and
generating and displaying the map further comprising the plurality of multidimensional coordinates as a plurality of indications in the at least two dimensions.

16. The method of claim 1, further comprising:
detecting a plurality of websites on which the user has an account and has confirmed acceptance to a plurality of data privacy policies of the plurality of websites;
accessing the plurality of data privacy policies of the plurality of websites via the network;
determining scores of the plurality of data privacy policies based on text of the plurality of data privacy policies, the text of the plurality of data privacy policies comprising at least one of data sharing permissions of the plurality of websites, data collection permissions of the plurality of websites, or data requirements of the plurality of websites;
determining a plurality of multidimensional coordinates in the at least two dimensions based on the scores of the plurality of data privacy policies, each of the plurality of multidimensional coordinates corresponding to one of the plurality of websites; and
generating and displaying the map further comprising the plurality of multidimensional coordinates as a plurality of indications in the at least two dimensions.

17. The method of claim 1, the detecting the attempt to access the particular website comprising detecting a particular webpage of the particular website loaded by a web browser executed by the computing device.

18. The method of claim 1, the detecting the attempt to access the particular website comprising detecting a Uniform Resource Locator ("URL") of a particular webpage of the particular website which is input to a web browser executed by the computing device.

19. The method of claim 1, further comprising:
searching a particular webpage loaded by a web browser executed by the computing device based on data received via the network; and
detecting a link to the particular data privacy policy in the particular webpage loaded by the web browser to access the particular data privacy policy.

20. The method of claim 1, the accessing the particular data privacy policy comprising downloading the particular data privacy policy to the computing device.

21. The method of claim 1, further comprising:
detecting the attempt to access the particular web site via a plugin in a web browser executed by the computing device;
downloading the particular data privacy policy to the computing device via the plugin;
determining the particular multidimensional coordinate based on the scores of the particular data privacy policy via the plugin; and
displaying via the computing device the map comprising the particular multidimensional coordinate via the web browser.

22. The method of claim 1, further comprising:
analyzing the text of the particular data privacy policy to identify a plurality of topics comprising the at least one of the data sharing permission of the particular website, the data collection permission of the particular website, or the data requirement of the particular web site;
determining the scores of the particular data privacy policy as particular multidimensional vectors corresponding to the plurality of topics, wherein each of the plurality of topics corresponds to a dimension; and
determining the particular multidimensional coordinate based on the particular multidimensional vectors.

23. The method of claim 1, further comprising:
receiving from the user indications of importance of a plurality of topics, the plurality of topics comprising the at least one of the data sharing permission of the particular website, the data collection permission of the particular website, or the data requirement of the particular website;

analyzing the text of the particular data privacy policy to identify the plurality of topics; and weighting the scores of the particular data privacy policy based on the identified plurality of topics and the indications of importance of the plurality of topics from the user.

24. The method of claim 1, further comprising:

analyzing the text of the particular data privacy policy to identify classes of data comprising at least one of user name, user address, or user location; and weighting the scores of the particular data privacy policy based on the identified classes of data.

25. The method of claim 1, further comprising:

analyzing the text of the particular data privacy policy to identify particular sections of the particular data privacy policy, the identifying of the particular sections of the particular data privacy policy comprising identifying topics comprising the at least one of the data sharing permission of the particular website, the data collection permission of the particular website, or the data requirement of the particular website;

receiving a request from the user to access the particular data privacy policy;

displaying via the computing device the particular data privacy policy and indications of the particular sections of the particular data privacy policy responsive to the request from the user to access the particular data privacy policy;

querying the user for permission to access the particular website; and receiving the instruction from the user via the computing device to enable the accessing of the particular website responsive to the querying of the user for the permission to access the particular website.

26. The method of claim 25, wherein determining the scores of the particular data privacy policy comprises determining scores of the particular sections of the particular data privacy policy, the method further comprising displaying the scores of the particular sections of the particular data privacy policy.

27. The method of claim 1, the enabling the accessing of the particular website comprising at least one of enabling downloading via the network Hypertext Markup Language ("HTML") code of a particular webpage of the particular website or enabling loading of the particular webpage of the particular website in a web browser executed by the computing device.

28. The method of claim 1, further comprising:

providing via the computing device a query asking whether the user permits access to the particular website; and receiving the instruction from the user via the computing device in response to the query.

29. A method of enabling application access comprising:

detecting an attempt to access a particular application via a computing device;

accessing a particular data privacy policy for the particular application via a network;

determining scores of the particular data privacy policy based on text of the particular data privacy policy, the text of the particular data privacy policy comprising at least one of a data sharing permission of the particular application, a data collection permission of the particular application, or a data requirement of the particular application;

determining a particular multidimensional coordinate in at least two dimensions based on the scores of the particular data privacy policy;

displaying via the computing device a map comprising the particular multidimensional coordinate as a particular indication in the at least two dimensions;

receiving an instruction from a user via the computing device to enable accessing of the particular application; and enabling the accessing of the particular application via the computing device in response to the instruction from the user.

30. The method of claim 29, further comprising accessing a plurality of data privacy policies of a plurality of applications via the network;

determining a plurality of scores of the plurality of data privacy policies based on text of the plurality of data privacy policies, the text of the plurality of data privacy policies comprising at least one of data sharing permissions of the plurality of applications, data collection permissions of the plurality of applications, or data requirements of the plurality of applications;

determining a plurality of multidimensional coordinates based on the scores of the plurality of data privacy policies, each of the plurality of multidimensional coordinates corresponding to one of the plurality of applications; and generating and displaying the map further comprising the plurality of multidimensional coordinates.

31. The method of claim 29, the detecting the attempt to access the particular application comprising detecting a webpage loaded by a web browser based on data received via the network.

32. The method of claim 29, further comprising:

searching a webpage loaded by a web browser of the computing device based on data received via the network; and detecting a link to the particular data privacy policy in the webpage loaded by the web browser to access the particular data privacy policy.

33. The method of claim 29, the accessing the particular data privacy policy comprising downloading the particular data privacy policy.

34. A method of disabling web site access comprising:

detecting an attempt to access a particular web site by a computing device via a network, the particular website comprising at least one webpage;

accessing a particular data privacy policy for the particular web site in response to detecting the attempt to access the particular website;

analyzing text of the particular data privacy policy to identify particular sections of the particular data privacy policy, the identifying of the particular sections of the particular data privacy policy comprising identifying a plurality of topics of the particular data privacy policy, the text of the particular data privacy policy comprising at least one of a data sharing permission of the particular website, a data collection permission of the particular website, or a data requirement of the particular website;

determining a particular multidimensional coordinate in at least two dimensions based on the text of the particular data privacy policy;

displaying via the computing device a map comprising the particular multidimensional coordinate as a particular indication in the at least two dimensions;

displaying via the computing device the particular data privacy policy and indications of the particular sections of the particular data privacy policy;

generating via the computing device at least one interactive query for enabling the accessing of the particular website and disabling the accessing of the particular website;

receiving via the computing device via the at least one interactive query an instruction from a user to disable the accessing of the particular website; and disabling the accessing of the particular website by the computing device in response to the instruction from the user.

35. The method of claim 34, further comprising:

determining scores of each of the particular sections based on the text of the particular data privacy policy, the scores comprising ratings of data permissions of the particular data privacy policy; and displaying via the computing device the scores of each of the particular sections.

36. The method of claim 34, further comprising:

receiving from the user of the computing device indications of importance of the plurality of topics, the plurality of topics comprising the at least one of the data sharing permission of the particular website, the data collection permission of the particular website, or the data requirement of the particular web site;

determining scores of each of the particular sections based on the text of the particular data privacy policy, the scores comprising ratings of data permissions of the particular data privacy policy;

weighting the scores of each of the particular sections based on the indications of importance of the plurality of topics;

generating an overall score based on the weighted scores; and determining the particular multidimensional coordinate based on the overall score.

37. The method of claim 34, the identifying of the particular sections of the particular data privacy policy further comprising identifying a plurality of classes of data of the particular data privacy policy.

38. The method of claim 34, wherein generating the at least one interactive query comprises displaying via the computing device an actuatable button for disabling the accessing of the particular website, and receiving the instruction from the user via the computing device by detecting user actuation of the actuatable button.

39. A web browser process comprising:

loading a webpage by a web browser executed on a computing device;

searching by a plugin in the web browser for a link to a data privacy policy on the webpage;

downloading and analyzing the data privacy policy via the plugin;

applying at least one classifier to text of the data privacy policy to generate a multidimensional coordinate in at least two dimensions and identify topics and sections of the data privacy policy, the text of the data privacy policy comprising at least one of a data sharing permission of the webpage, a data collection permission of the webpage, or a data requirement of the webpage;

displaying a mapping of the multidimensional coordinate as a particular indication in the at least two dimensions via the plugin;

receiving via the computing device an instruction from a user to inspect the data privacy policy;

displaying via the computing device the data privacy policy and indications of the topics and the sections of the data privacy policy in response to the instruction from the user to inspect the data privacy policy;

receiving via the plugin an instruction from the user to not accept the webpage; and at least one of closing or navigating away from the webpage via the plugin in response to the instruction from the user to not accept the webpage.

40. The process of claim 39, further comprising:

generating at least one interactive query via the computing device for accepting the webpage and not accepting the webpage; and receiving via the plugin the instruction from the user to not accept the webpage via the at least one interactive query.

* * * * *